Dec. 12, 1967 F. V. HALL 3,357,321
APPARATUS AND PROCESS FOR MAKING MULTI-SECTIONAL
FILTER TIPS FOR CIGARETTES
Filed July 8, 1965 16 Sheets-Sheet 1

INVENTOR.
FLOYD V. HALL
BY
Kenyon & Kenyon
ATTORNEYS

Dec. 12, 1967  F. V. HALL  3,357,321
APPARATUS AND PROCESS FOR MAKING MULTI-SECTIONAL
FILTER TIPS FOR CIGARETTES
Filed July 8, 1965  16 Sheets-Sheet 2
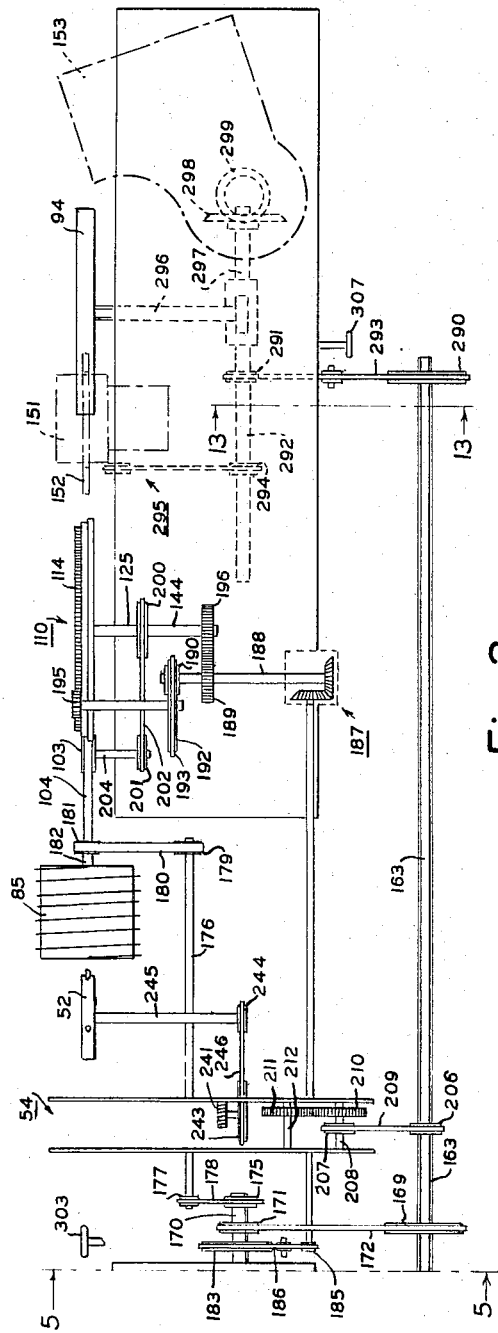
Fig.2
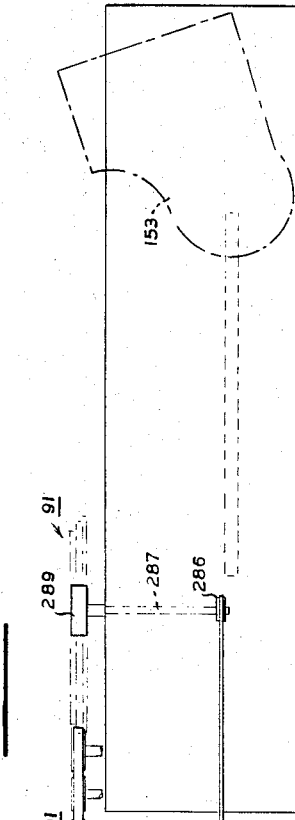
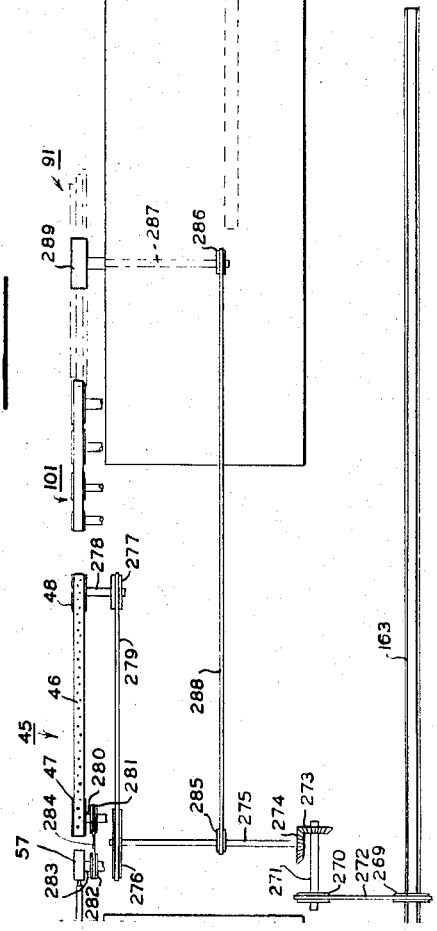
Fig.3
INVENTOR.
FLOYD V. HALL
BY
ATTORNEYS Dec. 12, 1967  F. V. HALL  3,357,321
APPARATUS AND PROCESS FOR MAKING MULTI-SECTIONAL
FILTER TIPS FOR CIGARETTES
Filed July 8, 1965  16 Sheets-Sheet 3
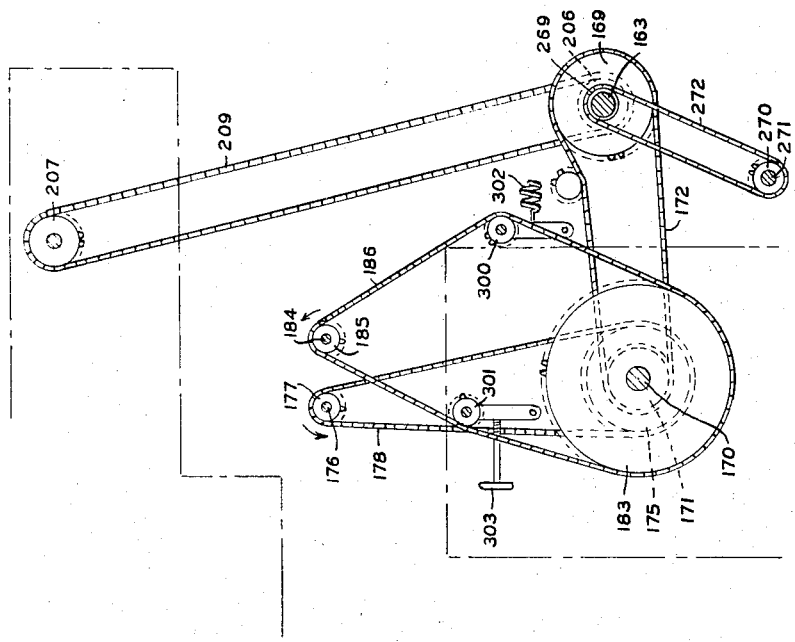
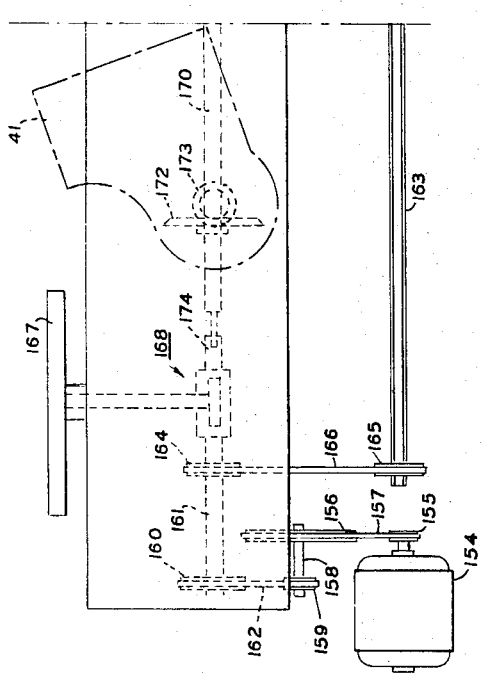
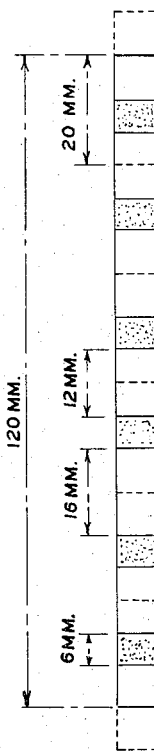
INVENTOR.
FLOYD V. HALL
BY
*Kenyon & Kenyon*
ATTORNEYS Dec. 12, 1967  F. V. HALL  3,357,321
APPARATUS AND PROCESS FOR MAKING MULTI-SECTIONAL
FILTER TIPS FOR CIGARETTES
Filed July 8, 1965  16 Sheets-Sheet 6

INVENTOR.
FLOYD V. HALL
BY
ATTORNEYS

Dec. 12, 1967     F. V. HALL     3,357,321
APPARATUS AND PROCESS FOR MAKING MULTI-SECTIONAL
FILTER TIPS FOR CIGARETTES
Filed July 8, 1965     16 Sheets-Sheet 8

INVENTOR.
FLOYD V. HALL
BY
Kenyon & Kenyon
ATTORNEYS

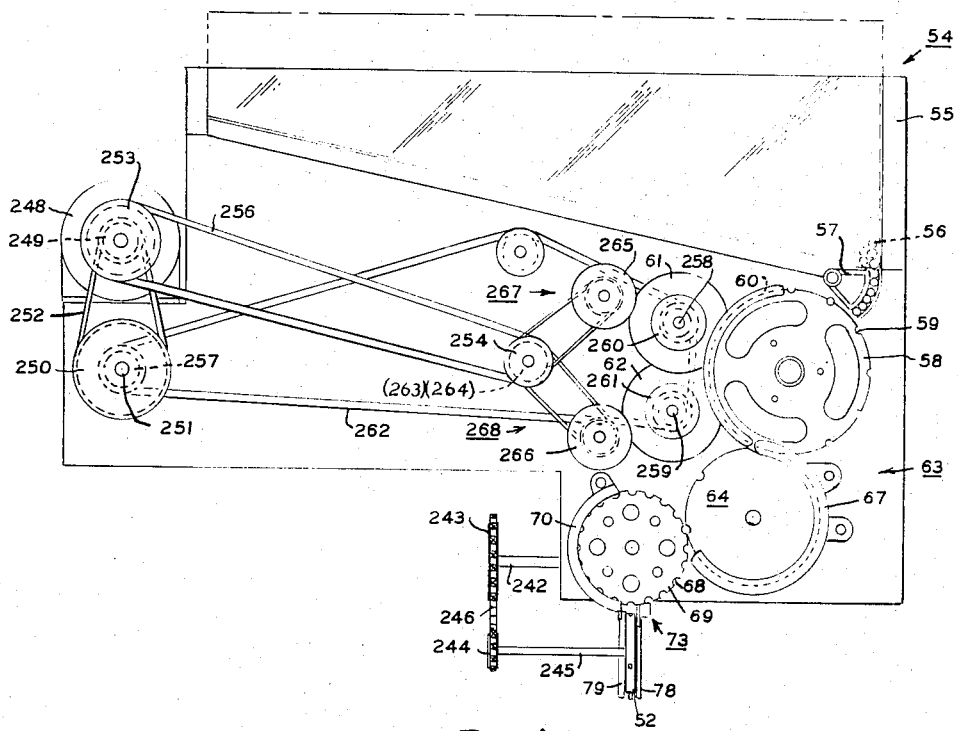
Fig. 14
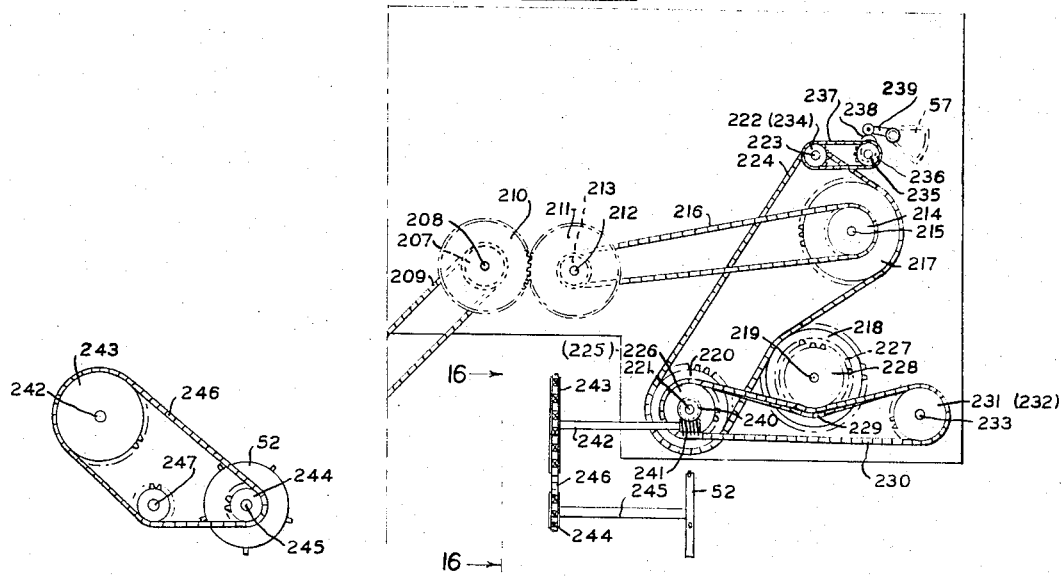
Fig. 16
Fig. 15
INVENTOR.
FLOYD V. HALL
BY
ATTORNEYS Dec. 12, 1967 F. V. HALL 3,357,321
APPARATUS AND PROCESS FOR MAKING MULTI-SECTIONAL
FILTER TIPS FOR CIGARETTES
Filed July 8, 1965 16 Sheets-Sheet 10

INVENTOR.
FLOYD V. HALL
BY
Kenyon & Kenyon
ATTORNEYS

Dec. 12, 1967 F. V. HALL 3,357,321
APPARATUS AND PROCESS FOR MAKING MULTI-SECTIONAL
FILTER TIPS FOR CIGARETTES
Filed July 8, 1965 16 Sheets-Sheet 12

INVENTOR.
FLOYD V. HALL
BY
Kenyon & Kenyon
ATTORNEYS

Dec. 12, 1967  F. V. HALL  3,357,321
APPARATUS AND PROCESS FOR MAKING MULTI-SECTIONAL
FILTER TIPS FOR CIGARETTES
Filed July 8, 1965  16 Sheets-Sheet 14

INVENTOR.
FLOYD V. HALL
BY
ATTORNEYS

Dec. 12, 1967  F. V. HALL  3,357,321
APPARATUS AND PROCESS FOR MAKING MULTI-SECTIONAL
FILTER TIPS FOR CIGARETTES
Filed July 8, 1965  16 Sheets-Sheet 15

INVENTOR.
FLOYD V. HALL
BY
ATTORNEYS

Dec. 12, 1967 F. V. HALL 3,357,321
APPARATUS AND PROCESS FOR MAKING MULTI-SECTIONAL
FILTER TIPS FOR CIGARETTES
Filed July 8, 1965 16 Sheets-Sheet 16

INVENTOR.
FLOYD V. HALL
BY
ATTORNEYS

United States Patent Office

3,357,321
Patented Dec. 12, 1967

3,357,321
APPARATUS AND PROCESS FOR MAKING MULTI-SECTIONAL FILTER TIPS FOR CIGARETTES
Floyd Vanmeda Hall, Durham, N.C., assignor to Liggett & Myers Tobacco Co., New York, N.Y., a corporation of New Jersey
Filed July 8, 1965, Ser. No. 470,386
25 Claims. (Cl. 93—1)

This invention relates to an apparatus and process for making filter tips for cigarettes. More particularly, this invention relates to an apparatus and process for making filter tips for cigarettes which tips comprise two sections of fibrous entrainment-type filter material separated by a section of granular adsorption-type filter material, these three sections being bound into an assembly by at least one layer of mouthpiece paper. Still more particularly, this invention relates to an apparatus and process for making filter tips for cigarettes, as described above, wherein the two sections of fibrous entrainment-type filter material are each of different lengths. Still more particularly, this invention relates to an apparatus and process for making filter tips for cigarettes, as described above, wherein the two sections of fibrous entrainment type filter material are each of different filter materials.

In the past, a number of machines and processes have been used to make multi-sectional filter tips for cigarettes. However, these machines and processes are only capable of producing filter tips which have entrainment-type filter material sections of equal length as well as of the same filter material.

This invention provides an apparatus and process for making multi-sectional filter tips for cigarettes having two entrainment-type filter material sections of unequal lengths and of different filter materials, e.g. one section is filter paper, the other, cellulose acetate, and spaced apart by a section of granular adsorptive-type filters material, e.g. charcoal. The invention further provides an apparatus which is adapted to receive as a feed a continuously generated stream of fibrous entrainment-type filter material in rod-like form; divide this stream into a first moving series of entrainment-type filter elements in equally spaced, axially aligned array; deliver this first series of filter elements onto a vacuum conveyor belt assembly in spaced array; receive a second moving series of entrainment-type filter elements in equally spaced array; deliver this second series of filter elements onto the vacuum conveyor belt assembly in spaced alternating relationship to the first series of filter elements; space each of these alternatively arranged filter elements an equal predetermined distance from each other; convey the equally spaced apart filter eleemnts onto an initially transversely flat strip of mouthpiece paper moving at the same speed as the filter elements; form the strip of mouthpiece paper into a channel-like transverse configuration as a partial enclosure for the filter element series; inject a charge of granular adsorption-type filter material into a pair of adjacent spaces between the filter elements of the entrainment-type filter element series; form the strip of mouthpiece paper completely around those elements of the entrainment-type filter element series between which charges of granular adsorption-type filter material have been ejected; seal this strip to generate a continuous rod-like stream of assembled filter material; and divide this rod-like stream through the mid-points of the alternating entrainment-type filter element sections thereof to form individual tri-sectional filter tips for cigarettes.

It is an object of this invention to provide an apparatus for feeding at least two streams of entrainment-type filter material elements, each stream having elements of different lengths from the other stream, into a single axially aligned series of spaced apart alternating lengths of filter material elements for incorporation into multi-sectional filter tips for cigarettes.

It is another object of this invention to provide an apparatus for feeding at least two streams of different entrainment-type filter material elements into an axially aligned series of spaced apart filter material elements of alternating materials for incorporation into multi-sectional filter tips for cigarettes.

It is another object of this invention to provide an apparatus for feeding at least two streams of different entrainment-type filter material elements, each stream having elements of different lengths from the other stream, into an axially aligned series of spaced apart alternating lengths of filter material elements of alternating materials for incorporation into multi-sectional filter tips for cigarettes.

It is another object of this invention to provide an apparatus for axially spacing each filter material element of a series of filter material elements of different lengths equally from the other filter material elements of the series.

It is another object of this invention to provide an apparatus for filling a pair of adjacent spaces between spaced apart filter material elements of alternating lengths with granular adsorptive-type filter material.

It is another object of this invention to provide a process for making multi-sectional filter tips for cigarettes which comprises the steps of dividing a stream of entrainment-type filter material into a first series of axially aligned and spaced apart elements, delivering the spaced apart elements to a vacuum conveyor belt assembly, delivering a second series of axially aligned and spaced apart entrainment-type filter material elements of different length and material from the first series of elements onto the vacuum conveyor belt assembly in alternating fashion with the first series of elements, spacing each of the elements of the alternating series of elements an equal distance from the other elements of the alternating series of elements, conveying the alternating series of equally spaced apart elements onto a flat strip of mouthpiece paper, elements, injecting a pre-determined quantity of granular adsorptive-type filter material simultaneously into each space of successive pairs of spaces between the elements of the alternating series of elements, enclosing those alternating filter material elements having the spaces therebetween filled with granular adsorptive-type filter material with the strip of mouthpiece paper to form a continuous rod-like stream, and severing the formed rod-like stream through the mid-points of consecutive entrainment-type filter material elements therein to form multi-sectional filter tips for cigarettes.

These and other objects and advantages of this invention will become more apparent from the following detailed description and appended claims when taken in conjunction with the accompanying drawings in which:

FIGURE 2 represents a partly structural and partly schematic plan view of the cigarette filter tip making apparatus particularly showing the upper right portion of the drive system;

FIGURE 3 represents a partly structural and partly schematic plan view of the apparatus of FIGURE 2 showing the drive mechanism for the apparatus lying under the mechanism shown in FIGURE 2;

FIGURE 4 represents a partly structural and partly schematic plan view continuation of the apparatus of FIGURE 2 and showing the balance of the drive system to the left of the system shown in FIGURE 2;

FIGURE 5 represents a side elevation view of the mechanism taken on line 5—5 of FIGURE 2 whereby the mechanism for producing the injection of the granular adsorption-type filter material into the filter assembly may be either advanced or retarded to maintain synchronization with the flow of filter elements through the apparatus;

FIGURE 9 represents a partly structural and partly schematic view in the side elevation of a length or segment of the filter tips produced by this apparatus;

FIGURE 14 represents a front view of a cutter adapted for feeding and discharging the longer length filter elements;

FIGURE 15 represents a front view, partly schematic of the drive of the cutter of FIGURE 14;

FIGURE 16 is a fragmentary end view on the line 16—16 of FIGURE 15;

Figure 1:
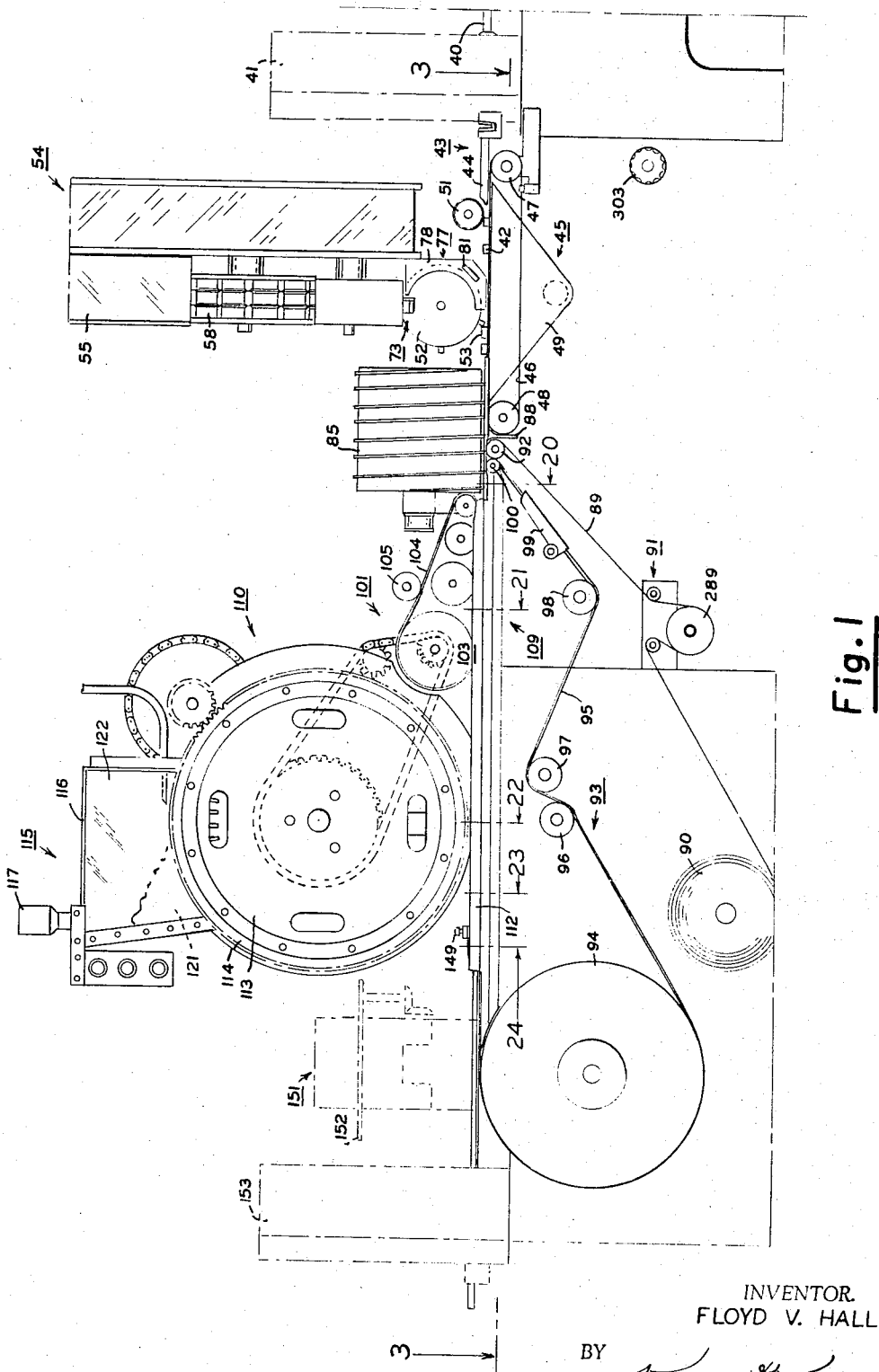
FIGURE 1 represents a view in front elevation of the cigarette filter tip making apparatus of this invention.
Figure 25:
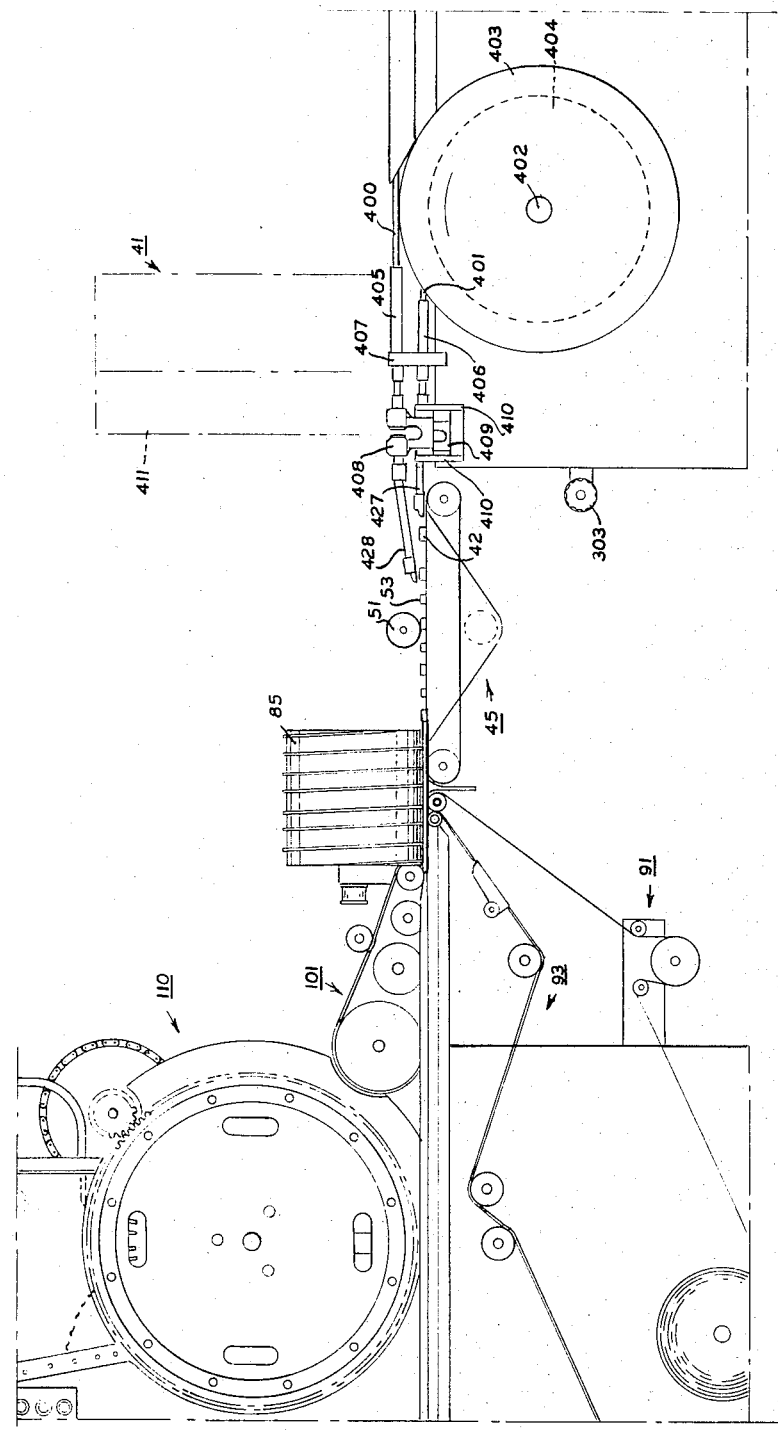
Figure 26:
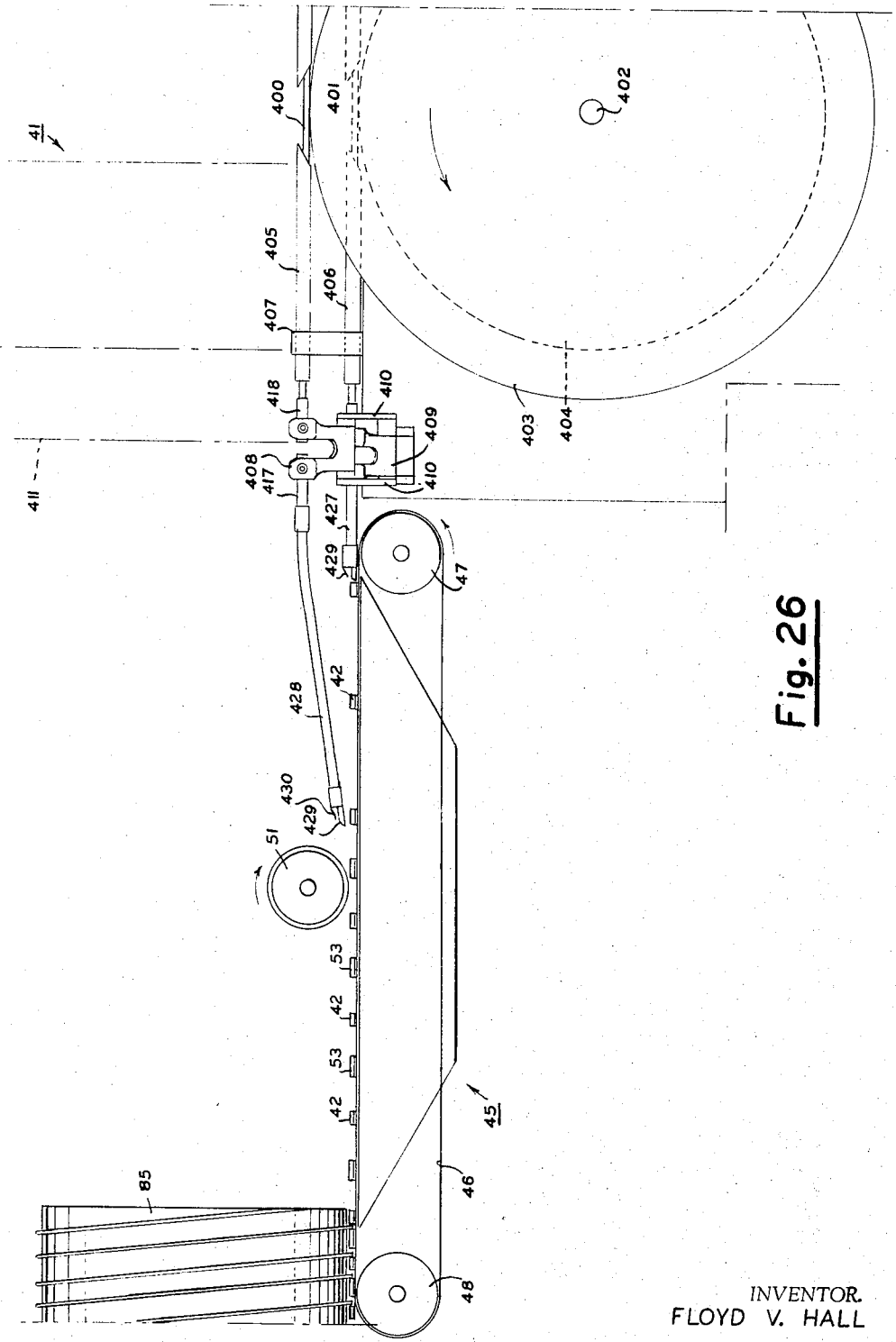
Figure 27:
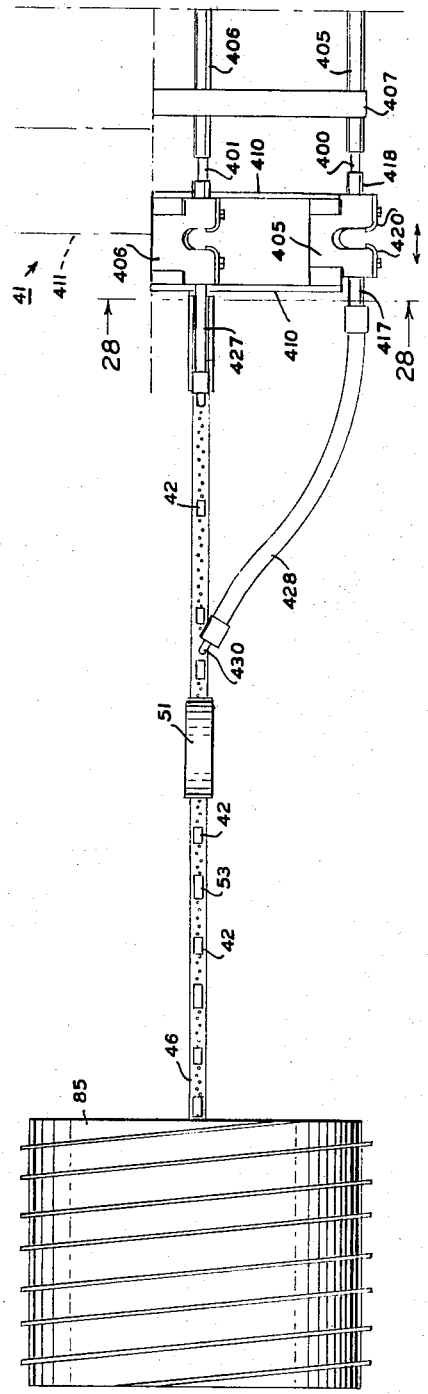
Figure 28:
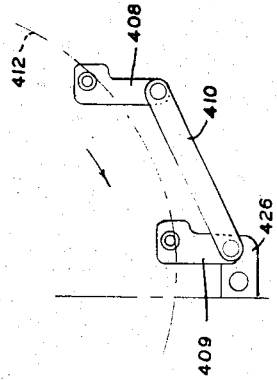
Figure 29:
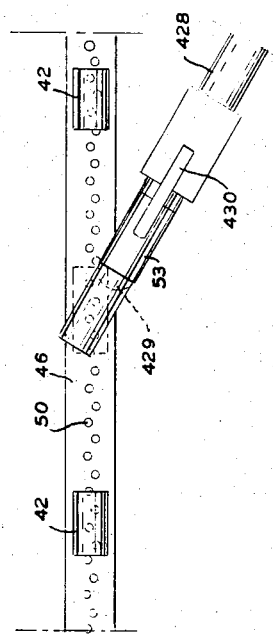
Figure 31:
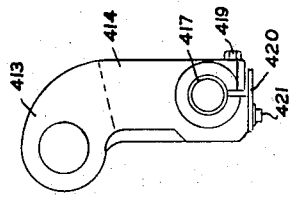
Figure 32:
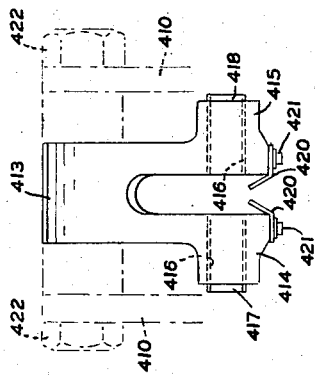
Figure 30:
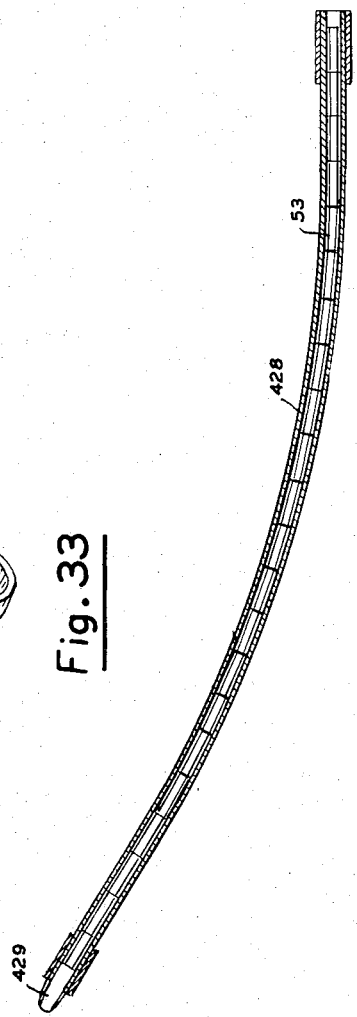

FIGURES 20, 21, 22, 23 and 24 represent consecutive views in transverse sectional elevation through the mouthpiece paper conveyor belt and guide mechanism taken respectively at stations 20, 21, 22, 23 and 24 in FIGURE 1 and looking in the direction of the arrows;

FIGURE 25 represents a partial view in front elevation of an alternate means of producing dissimilar length filter tip elements and assembling them in an alternate collated spaced relationship, and generally using many of the elements of the apparatus of FIGURE 1;

FIGURE 26 represents an enlarged partial view of the front elevation of FIGURE 25 showing in particular the feeding, cutting and collating mechanism of the alternate filter tip assembly mechanism of FIGURE 25;

FIGURE 27 represents a plan view partly schematic and showing the filter tip advancing mechanism of the apparatus of FIGURE 26;

FIGURE 28 represents an end view taken on the line 28—28 of FIGURE 27 and showing the arrangement of a ledger system for the dual feeding of the filter rods to the cutting position;

FIGURE 29 represents an enlarged plan view of the discharge end of the outer curved filter element ledger tube of FIGURE 27;

FIGURE 30 represents a sectional view of the discharge tube of the outer curved filter element ledger tube of FIGURE 27 showing the filter elements arranged therein;

FIGURE 31 represents a side view of a ledger tube clamp as used in the apparatus of FIGURE 25;

FIGURE 32 represents a top view of the ledger tube clamp of FIGURE 31; and

Figure 33:
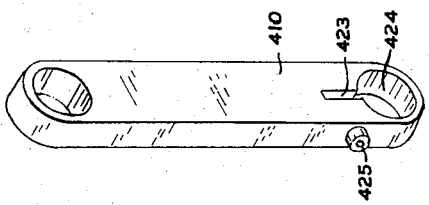

FIGURE 33 represents an isometric view of an extension bar for carrying the ledger tube clamps of FIGURE 25 in predetermined spaced relationship.

Referring first to FIG. 1, a continuously generated rod-like stream of fibrous entrainment-type filter material, such as, cellulose acetate, is fed through a delivery conduit 40 into a cutter assembly 41 which divides the rod-like filter material stream into a series of filter tip elements 42 of equal length, for example, 12 mm. Cutter assembly 41, although performing an essential function in cutting the rod-like stream into individual elements, may be of known design and manufacture such as a Standard Cigarette Cut-Off Unit having a cutter head made by American Machine and Foundry Co., identified by Catalogue number Class 1—Division 74. The filter elements 42 are fed from the cutter 41 through a flow control assembly 43 which comprises a ledger tube 44 through which the severed filter elements 42 are pushed to and onto a vacuum conveyor belt assembly 45 in a spaced apart manner.

Figure 11:
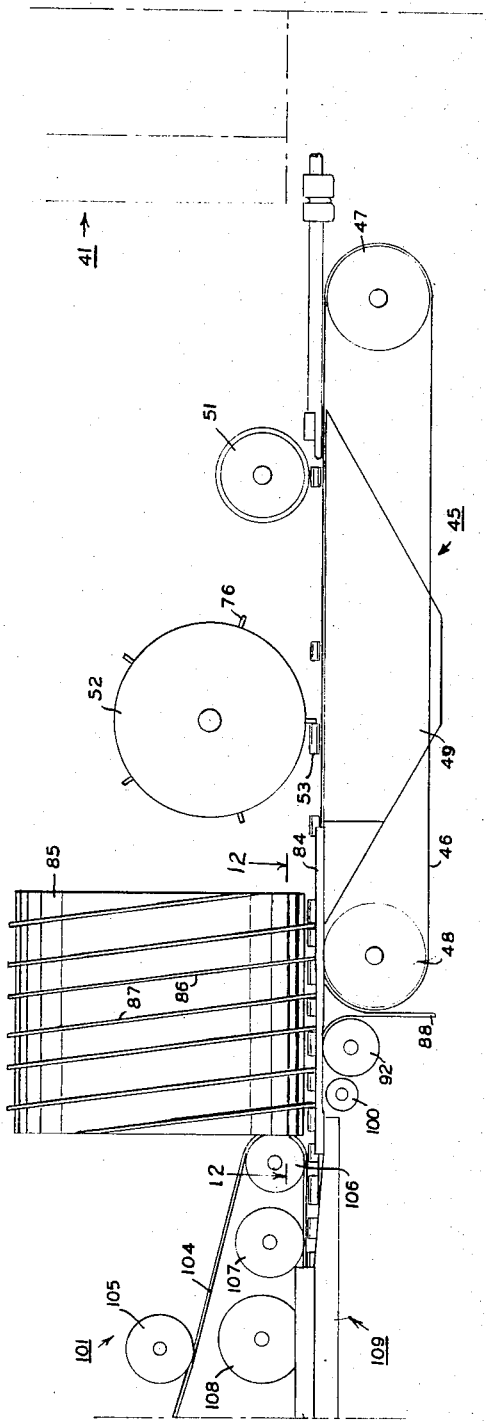
FIGURE 11 represents an enlarged front elevation view showing the relation of the parts and the filter tip elements of alternate length as assembled and collated in spaced relationship.
Figure 12:
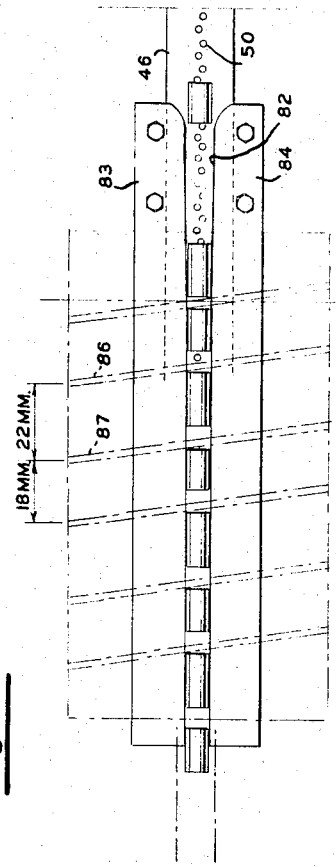
FIGURE 12 represents a plan view partly schematic on the line 12—12 of FIGURE 11 showing the collating of filter tips of two lengths in alternate arrangement and in spaced relationship as provided by a double pitch spacing drum.

The vacuum conveyor belt assembly 45, as shown in FIGS. 11 and 12, is comprised of a continuous perforated belt 46 which is carried by a pair of rollers 47, 48 over a vacuum chamber 49. The vacuum chamber 49 creates a continuous suction force which acts on the delivered fibrous filter elements 42 through the perforations 50 in the belt 46 and is sufficient to maintain the fibrous filter elements 42 thereon. In order to insure the deposition of the fibrous filter elements 42 on the perforated belt 46, a roller 51 is interposed in the path of the elements 42 as they leave the ledger tube 44. This roller 51 is dimensioned so as to engage the tops of the elements 42 with a slight pressure. The roller further rotates at the same speed as the perforated belt 46 so that there is no unbalance of forces on the elements 42. As shown in FIG. 12, the perforations 50 in the belt 46 are staggered on either side of the longitudinal axis of the belt 46. The amount of staggering is such that the distance between the axes of the two longitudinal row of perforations is approximately 1/32 of an inch. The orientation of the perforations 50 permits the created vacuum to align the fibrous filter elements 42 in a longitudinal direction on the belt 46.

The spaced apart fibrous filter elements 42 are conveyed along the vacuum belt assembly and pass under a spoked delivery wheel 52 wherefrom a second series of filter elements are delivered to the vacuum conveyor belt assembly 45. This series of filter elements may be of the same type of material as the first series; however, for purposes of this described embodiment of the invention, these filter elements are referred to as made of filter paper. The series of filter paper elements 53 is supplied to the vacuum conveyor belt assembly 45 by means of a second cutter assembly 54 which divides each element of a continuously supplied series of rod-like filter paper elements of predetermined length, for example, 48 mm. into three equal lengths, i.e., 16 mm.

Figure 18:
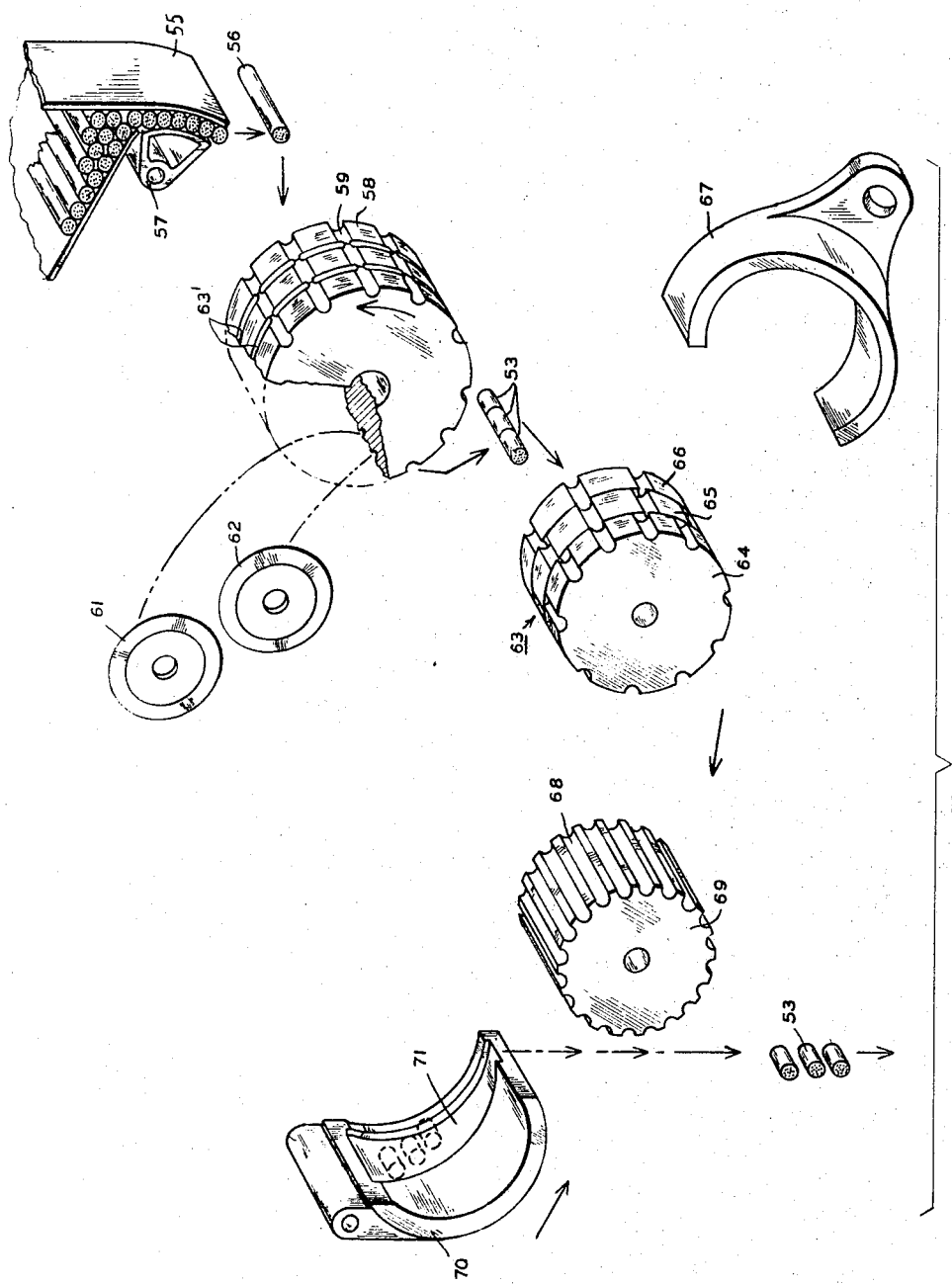
FIGURE 18 is an exploded isometric view of the cutting and feeding mechanism of the cutter of FIGURE 14.

The second cutter assembly 54, as shown in FIGS. 14 and 18, comprises an apparatus which is generally comparable to an apparatus as described in United States Patent No. 3,036,581, issued on May 29, 1962; however, there are modifications in the cutter assembly 54 which differ from the described apparatus in the aforesaid patent grant and which are herein set forth. Cutter assembly 54 comprises a filter plug feed hopper 55 which feeds a plurality of filter paper plugs 56 through an adjustable feed regulator 57 to a plug cutting drum 58. The feed regulator 57 is shaped and positioned in the hopper 55 such that the plugs 56 are fed one at a time to the plug cutting drum 58. The plugs 56 are each received in a groove 59 in the peripheral surface of the cutting drum 58 which rotates in a counter-clockwise direction as viewed in FIG. 14. An arcuate guard 60 is spaced from the cutting drum 58 to maintain the delivered plugs 56 in the grooves 59. A pair of plug cutting knives 61, 62 are positioned intermediately of the limits of guard 60 and pass through the plane of the guard 60 in any suitable manner, such as, through slots in the guard 60. In order to avoid any contact between the cutting drum 58 and knives 61, 62, a pair of continuous grooves 63' are formed in the cutting drum 58 to provide the necessary clearance. The knives 61, 62 are positioned to sever the plugs 56 into three equal elements 53.

After the elements 53 are formed they are carried by the plug cutting drum 58 and deposited into a plug separating drum assembly 63. The plug separating drum assembly 63 includes three aligned rotatable drums 64, 65, 66, each of which have a series of grooves in their peripheral surfaces. These grooves are arranged such that at the point of deposition of the three elements 53 into the separating drum assembly 63, the grooves are aligned. however, as the drums 64, 65, 66 rotate in a clockwise direction, they rotate at different speeds from each other causing the elements 53 to separate from each other in their orbital travel. The elements 53 are maintained in the separating drum assembly 63 by shroud 67 which envelops the drums 64, 65, 66 in the usual manner.

After the filter paper elements 53 are separated, the plug separating drum assembly 63 delivers them to the grooves 68 of a plug transfer drum 69 one at a time. As viewed in FIG. 14, the plug transfer drum 69 rotates in a counter-clockwise direction and has a shroud 70 spaced around a part thereof. The shroud 70 not only serves to maintain the delivered elements 53 in the transfer drum assembly 69 but also has a cam channel 71 as shown in FIG. 18, therein for guiding successive elements 53 into a single delivery position at the end of the shroud 70. This delivery position is directly above the spoked delivery wheel 52. Thus, each filter paper element 53 is delivered to the spoked delivery wheel 52 as the transfer drum 69 rotates past the delivery position. In order to insure the depositing of the several filter paper elements 53 onto the spoked delivery wheel 52, the shroud 70 is provided with a depending flange 72 which overlies one side of the delivery wheel 52 while a spring plate retainer 73 is provided to the side of the delivery wheel 52 opposite the flange 72. Thus, the flange 72 and plate retainer 73 define a passageway to the delivery wheel 52. The spring plate retainer 73 is fixed to the shroud 67 in a manner not shown by means of the flange 74 which is perpendicular to the resilient plate portion 75. The resilient plate portion 75, due to its resiliency, will prevent jamming of a filter element 53 between the transfer drum 69 and plate retainer 73.

After being individually deposited on the delivery wheel 52 the filter elements 53 are pushed therearound by spokes 76, one spoke pushing one element. In order to maintain the elements 53 on the delivery wheel 52, a guide system 77 is provided part-way around the periphery of the delivery wheel 52. The guide system 77 includes two transparent side guide plates 78, 79 located to the sides of the delivery wheel 52, a transparent back guide plate 80 located around the periphery of the delivery wheel 52, and a resilient plug retainer 81 secured to the side guide plate 78. The guide plates 78, 79, 80 are positioned with respect to the delivery wheel 52 and each other so as to form a channel therearound in spaced relation thereto. The spacing of the guide system 77 is such as to permit the free passage of a filter element 53 therethrough.

The resilient plug retainer 81 projects into the plane of the channel formed by the guide plates 78, 79, 80 through a suitable slot in side guide plate 78 for the purpose of providing a stop means for a filter element 53 in the event that the filter element 53 has moved ahead of its respective spoke 76. However, when the respective spoke 76 is again in contact with the stopped filter element, the resilient plug retainer 81 is flexed out of the plane of the channel of the guide plates by the force exerted by the spoke 76 in order to permit passage of the filter element onto the vacuum conveyor belt assembly 45.

The filter paper elements 53 are delivered to the vacuum conveyor belt assembly 45 and aligned thereon by the vacuum in a manner as described above and in a manner whereby the fibrous filter elements 42 alternate with the longer filter paper elements 53. This alternating manner is obtained by the synchronization of the spacing of the spokes 76 on the delivery wheel 52, the initial spacing of the fibrous filter elements 42, the speed of the delivery wheel 52 and the speed of the conveyor belt 46. The alternating series of filter elements 42, 53 is carried by the conveyor belt 46 into a guide channel 82 formed by a pair of elongated guides 83, 84 (FIG. 12). The foremost portion of the guide channel 82 is shaped in an inwardly converging manner to direct the alternating series of filter elements 42, 53 into an aligned path for passage to a threaded worm spacing drum 85.

Figure 17:
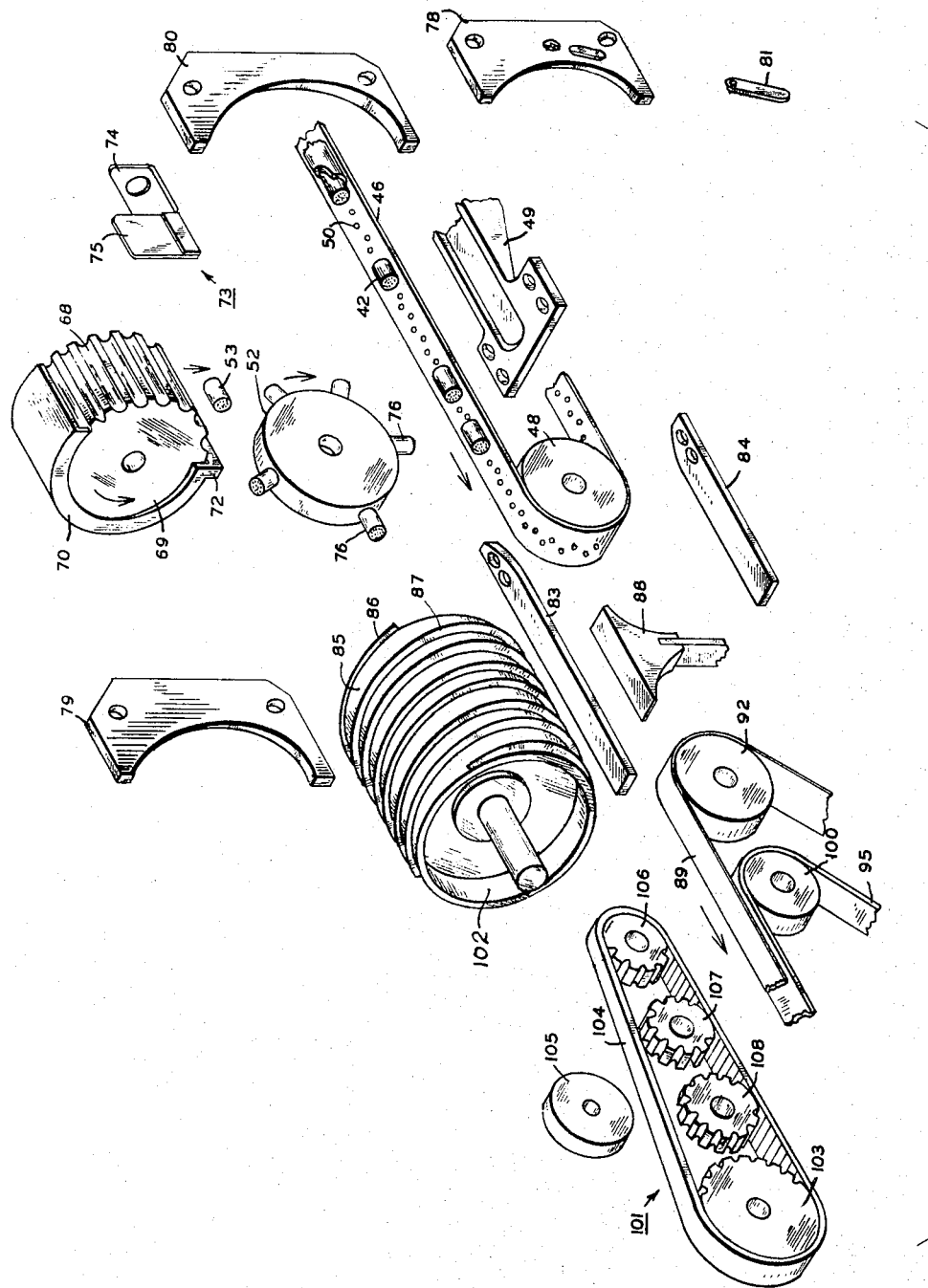
FIGURE 17 is an exploded isometric view of the feed elements for receiving and collating in alteration the filter tips of unequal length and in a predetermined spaced relationship.

The threaded worm spacing drum 85 is provided with a pair of threads 86, 87 each of which, as shown in FIGS. 11 and 17, alternate with respect to each other. The threads 86, 87 are fixed on the drum 85 in a manner to engage the filter elements so as to space each element an equal distance from the element in front of and in back of it. Accordingly, the threaded worm drum 85 is positioned in alignment over one end of the vacuum conveyor belt 46. Each thread 86, 87 has a pitch of 40 mm.; however, the threads are spaced so as to provide alternating pitches therebetween 18 mm. and 22 mm. as shown in FIG. 11.

As the filter elements of the alternating series reaches the cut-off point of the vacuum chamber 49 they are engaged by and carried forward through the guide channel 82 by the threads of the spacing drum 85. The longer filter paper elements 53 (16 mm.) are each received in the larger gap formed by the threads 86, 87 and the shorter fibrous filter elements 42 (12 mm.) are received in the shorter gap. The spacing between succeeding filter elements within the limits of the drum is thus fixed at a constant amount (6 mm.).

The equi-spaced filter elements 42, 53 are directed by the spacing drum 85 over a bridge 88 to a continuously generated strip of mouthpiece paper 89. The strip of mouthpiece paper 89 is generated from a roll 90 by means of a suitable drive assembly 91 and directed over a guide roller 92 which is positioned under the spacing drum 85 and in alignment with the stream equi-spaced filter elements so that the filter elements are received on the strip of mouthpiece paper 89 while still under the influence of the spacing drum 85. The bridge 88 insures a continuity of flow of the filter elements from the vacuum conveyor belt 46 to the strip of mouthpiece paper 89.

The strip of mouthpiece paper 89 with the equi-spaced filter elements thereon is directed over and onto a conveyor belt assembly 93 while still within the limits of the spacing drum 85. The conveyor belt assembly 93 includes a main drive roller 94 which drives a continuous flexible conveyor belt 95 through a tensioning system of rollers 96, 97, 98 which are arranged in any suitable manner, for example, as shown in FIG. 1. A pivotable transversely curved guide chute 99 is further provided in the conveyor belt assembly 93 to insure flatness of the belt 95 as the belt 95 is carried over the guide roller 100 which is positioned at the end of the conveyor belt assembly 93 under the spacing drum 85.

In order to maintain the spacing of the filter elements 42, 53 on the strip of mouthpiece paper 89, a hold-down assembly 101 is positioned over the conveyor belt 95 adjacent the spacing drum 85. As shown in FIG. 17, the end of the spacing drum 85 is provided with a recessed portion 102 which allows one end of the holddown assembly 101 to project into the plane thereof. The holddown assembly 101 includes a drive roller 103 which drives a continuous belt 104 under a tensioning roller 105 and over a tail roller 106 which projects into the recessed portion 102 of the spacing drum 85. A pair of rollers 107, 108 are further provided between the drive roller 103 and tail roller 106 to impart a holddown force on the belt 104 therebetween. The form of the rollers and belt of the holddown assembly 101 can be of any suitable type, for example, as shown in FIG. 17, the rollers are toothed to fit within an interiorly grooved belt; the drive roller 103 having sixty teeth and the tail roller 106 ten teeth. As the equi-spaced filter elements are fed from the spacing drum 85 they are pressed to the strip of mouthpiece paper 89 with a slight force by the holddown assembly conveyor belt 104. The equi-spaced filter elements and strip of mouthpiece paper 89 are thence fed through a slide plate assembly 109 which is positioned under the holddown assembly 101.

Figure 19:
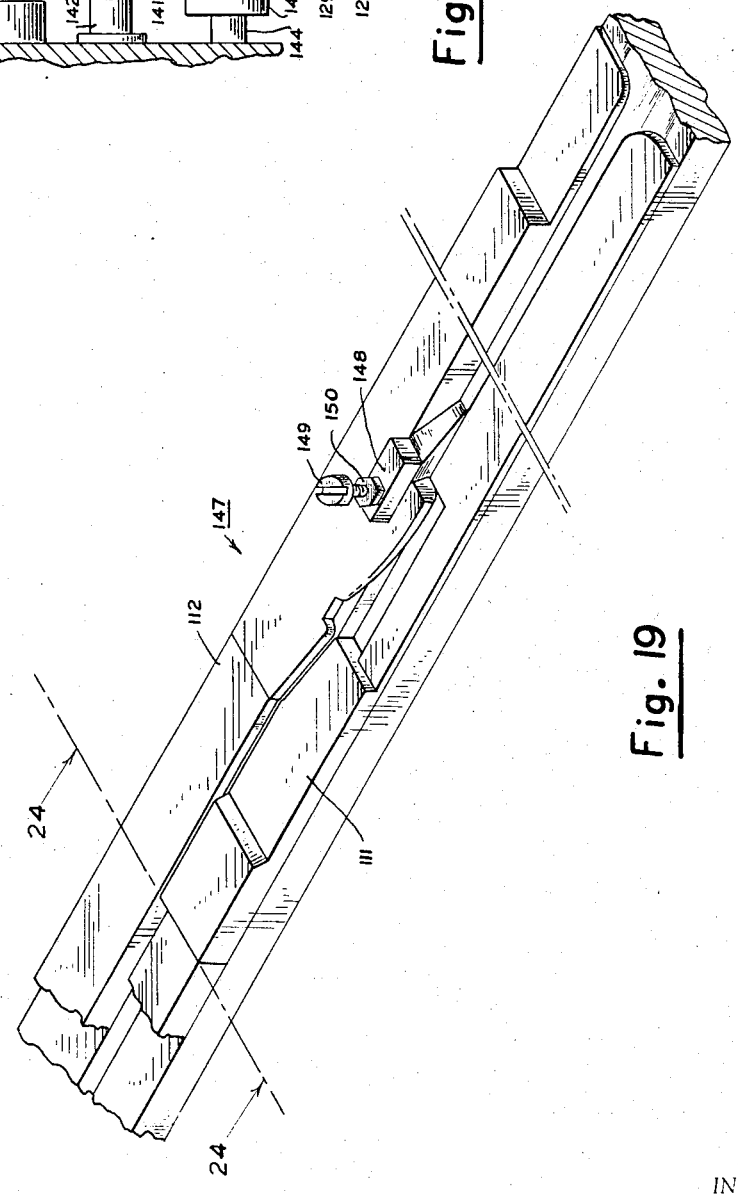
FIGURE 19 represents a rear perspective view of the garniture section of the mouthpiece paper conveyor belt and guide mechanism.
Figure 20:
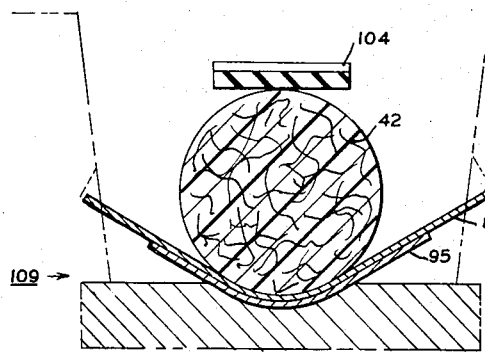
Figure 21:
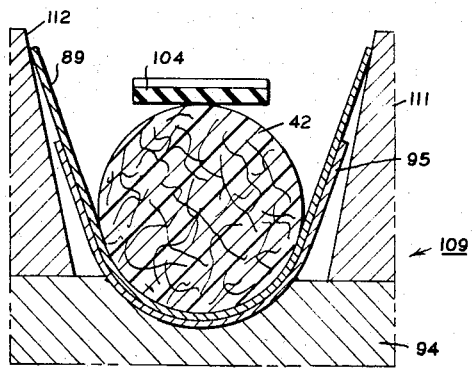
Figure 22:
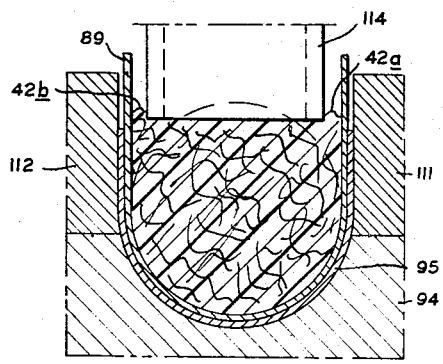
Figure 23:
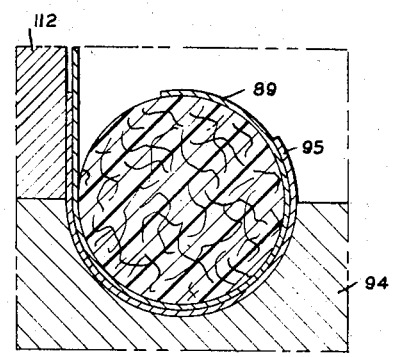
Figure 24:
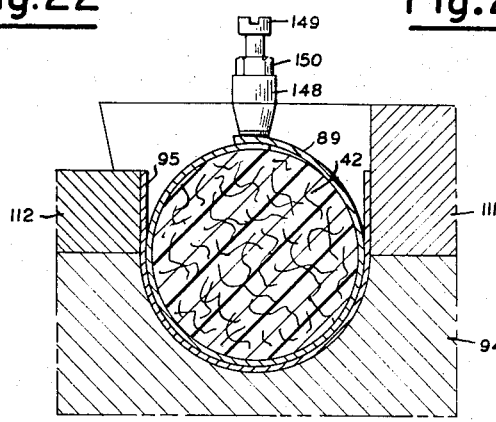

Referring to FIGS. 19 to 24, the slide plate assembly 109 shapes the conveyor belt 95 and strip of mouthpiece paper 89 into a V-shape around the equi-spaced filter elements 42, 53 for delivery under an injection mechanism 110. As shown in FIGS. 20 and 21, the holddown conveyor belt 104 is dimensioned so as to fit within the planar limits of the equi-spaced filter elements so as not to interfere with the operation of the slide plate assembly 109. At station 20 as seen in FIG. 1 and fragmentarily and sectionally shown in FIG. 20 the belt 95 rests on slide plate 109 and is ready to enter the channel formed by side members 111 and 112. The edges of the belt 95 are canted upwardly and inwardly toward the inner walls of side members 111 and 112 and are shown in phantom outline. Farther down the channel at station 21 (FIG. 1) as shown in FIG. 21 conveyor belt 95 and paper 89 are now approaching the U-form, while the holddown belt 104 is still engaging the equi-spaced filter elements and holding down the filter elements, conveyor belt, and paper in the channel and assisting in the even forward movement of these items. At station 22 (FIG. 1) still farther down the channel and shown sectionally and fragmentarily in FIG. 22 is the location whereat the granular filter material is injected into the separation space between successive filter elements. At this stage of operation the belt and paper are in a U-form within the channel; three exemplary filter elements have been advanced past the holddown belt 104, and these three elements are now under the radially chambered wheel 113 having a rim portion 114 whose outer periphery is arranged to contact and flatten slightly the upper portions of the three filter elements in question and, of course, all succeeding filter elements. The flattening of these filter elements causes portions thereof to move outwardly and upwardly forming portions 42a and 42b which provide sealing contact with the face of wheel rim 114. Quantitatively, a filter element 42 having a diameter of 5/16 in. should be flattened about 0.068 in., that is, about twenty percent of its diameter.

Figure 6:
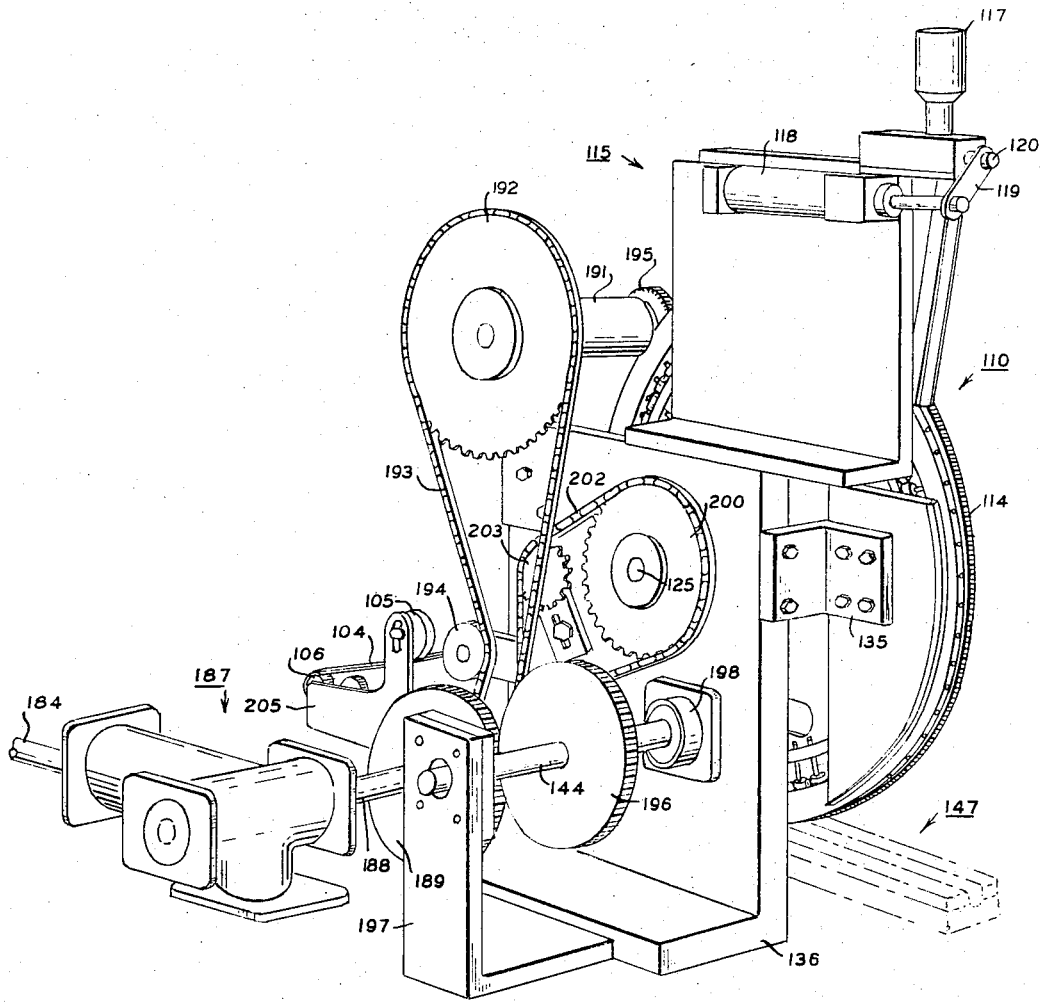
FIGURE 6 represents a rear perspective view of the granular adsorption-type filter material injection mechanism of the filter tip making apparatus.
Figure 7:
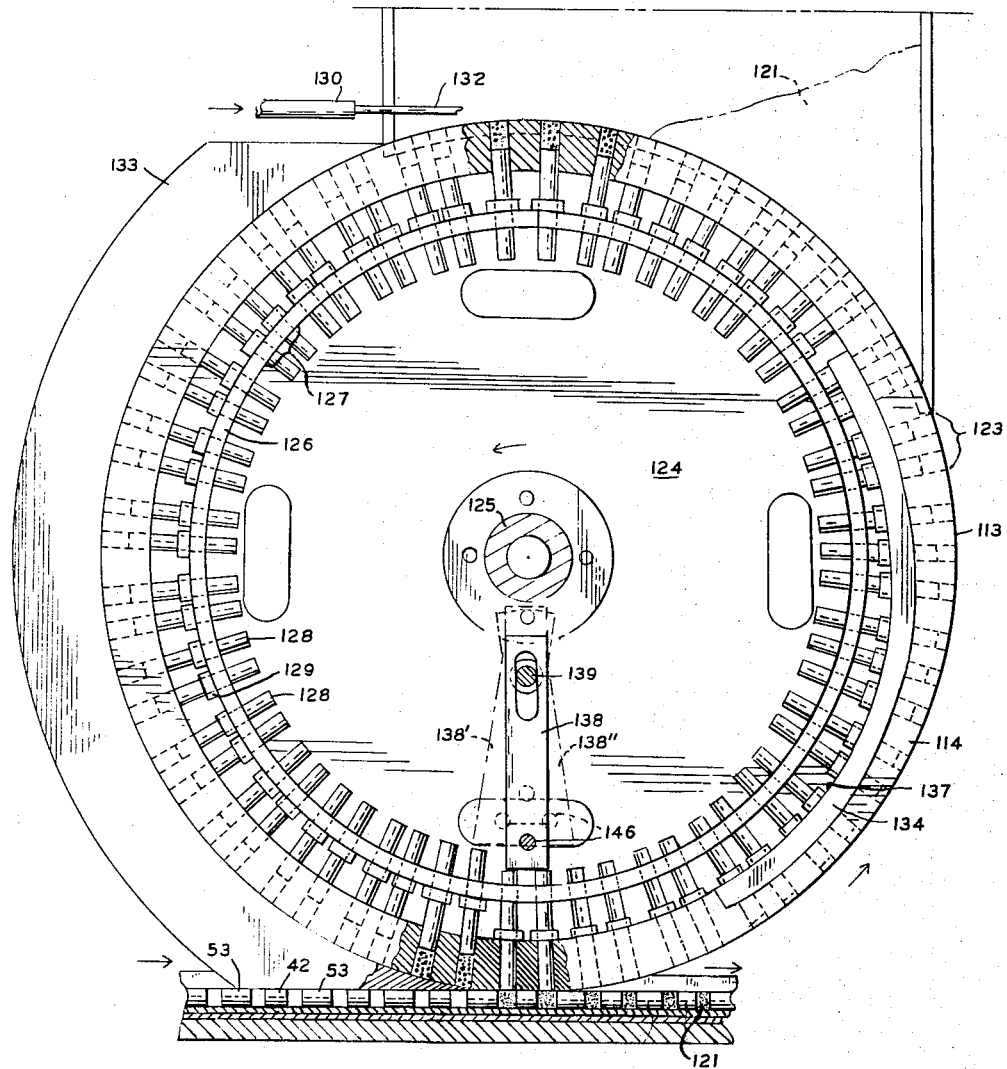
FIGURE 7 represents a view in rear elevation of the radially chambered wheel and chamber plunger and plunger operating mechanism shown in FIGURE 6.

The injection mechanism 110 of the present invention for injecting granular adsorption-type filter material, of which mechanism wheel 113 is a part, is best seen in FIGS. 1, 6 and 7, and includes a material hopper 115 having a cover 116, a filling gate 117 which has an inlet slide valve having a control system including an air cylinder 118 connected by arm 119 to valve rod 120. The valve control is actuated by means (not shown) energized by an electric eye system having level sensing points (not shown) providing both upper and lower limits to the level of granular charcoal 121 in the hopper. The granular material is fed and controlled so as to lie against one end of and extending therefrom to a point intermediate the ends of the hopper. The sides 122 of the hopper are preferably made of transparent material such as an acrylic plastic to provide means for a machine opertor to visually check the level of the granular material. The hopper is adapted to fit snugly to rim 114 with appropriately formed seals permitting wheel 113 to rotate so that the moving outer periphery of its rim 114 is presented to the charcoal. Within rim 114 are a plurality of pairs of equally spaced radially disposed holes 123 which, as exemplified in FIG. 7, are thirty in number. These pairs of holes 123 are spaced an arcuate distance of 40 mm. from centerline to centerline on the outer periphery of the rim 114; further, the holes in each pair are spaced from each other an arcuate distance of 18 mm. from centerline to centerline on the outer periphery of the rim 114. Rim 114 is mounted on a hubbed web plate 124 carried by a shaft 125. Mounted on plate 124 is a retaining ring 126 concentric with rim 114 having a like number of equally spaced pairs of holes 127, each aligned with a corresponding pair of holes 123.

A plunger 128, having intermediate its ends a shoulder 129, is slidably mounted in each pair of holes 123 and 127 with the shouldered part between rim 114 and ring 126. The shoulder 129 is urged into engagement with rim 114 the outer end of the plunger is substantially flush with the outer periphery of the rim. This position of the plunger is called the "expelled" position. At the other or inner limit of plunger motion, shoulder 129 is urged against ring 126. This is called the "retracted" position of the plunger. The outer end of plunger 128 is a predetermined distance within the rim and provides the bottom of a cylindrical loading chamber of determinate volume. With the plunger in its retracted position, the rim is moved in way of the hopper from which granular material 121 flows by gravity into the loading chamber. Where charcoal is the granular material to be loaded, a grain size in the range of 12 to 40 mesh is preferred.

Intermediate the ends of the hopper, rim 114 emerges from below the pile of granular material 121 which, as seen in FIGS. 1 and 7, has a more or less triangular configuration in the hopper. Two general conditions with respect to the pile itself, assuming it to be a charcoal pile, should obtain for satisfactory filling of successive chambers in wheel rim 114. The first of these is that the leading lower edge of the pile (right hand corner as seen in FIG. 1) stop short of a vertical diametric line through wheel 113. The second of these is that the apex or top corner of the pile lie on a diametric line through wheel 113 approximately 45° off of a vertical diametric line.

After emerging from below the pile of granular material 121 but while still in way of the hopper, the periphery of rim 114 is freed of residual granular material, i.e., residual charcoal, by means of an air jet cleaner. This cleaner uses pressurized air delivered by a hose 130 attached to a tubular nozzle 132 mounted in an end wall of hopper 115 so as to direct the emerging air blast tangentially against the approaching rim. The velocity of the air emerging from the nozzle may be varied by a pressure regulator (not shown) providing therewith means to adjust the jet cleaner to suit variable conditions such as humidity and the particle size of granular filter material 121.

The cleaned rim 114 with granular material 121 filling its successive loading chambers moves from the hopper, and the rim periphery is brought into a very close and/or sliding or rubbing contact with an accurately fitted retaining shroud 133. This shroud extends from a point adjacent the hopper to a point quite near a vertical diametric line through the rim. It is to be noted that the lower portion of the shroud 133 is shaped so as to permit the cut filter elements to be carried in close proximity to its under surface. The closely-fitting inner surface of shroud 133 provides means for the filled loading chambers of rim 114 to be moved from the hopper to a bottom discharge location without any spillage of the granular contents of the chambers.

As each pair of loaded chambers leaves the shroud 133 it is positioned over a pair of void spaces between three sequential filter elements, the intermediate element being the shorter element 42, and the granular material such as activated charcoal in the chambers is driven from them by rapid downwardly driven movement of plungers 128. This downward movement of the plungers is halted by the engagement of shoulders 129 with the inner surface of rim 114 and, in this expelled position with the plunger outer ends flush with the rim, the rim is moved for a short distance more in its rotation cycle. A retracting cam 134 mounted by a bracket unit 135 (FIG. 6) to a base supported angle member 136 has an arcuate inner surface 137 disposed to engage the outer surface of shoulders 129 at a point approximately thirty degrees beyond the aforementioned bottom discharge location. Surface 137 is disposed and configured to cam successive parts of plungers 128 into retracted disposition with their shoulders 129 against ring 126. As seen somewhat diagrammatically in FIG. 7 this move to the retracted position is completed at or near a point one hundred degrees beyond the discharge location with cam 134 continuing to engage plunger shoulders 129 until successive chambers in the rim reach under the hopper, at which point the cam is terminated and the rim comes in way of the hopper with successive plungers in the retracted position.

Figure 8:
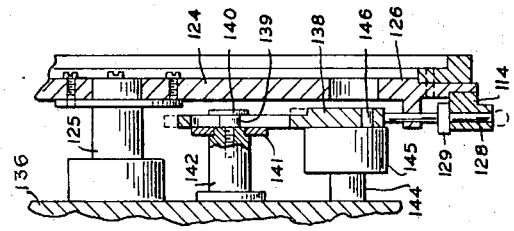
FIGURE 8 represents a view in the side elevation, and partly in section, of a fragment of the radially chambered wheel and plunger and of the plunger operating mechanism of FIGURE 7.

The mechanism for imparting the rapid downward movement of each pair of plungers to the expelled position is best seen in FIGS. 6, 7 and 8 and includes a hammer 138 which is slotted vertically at its upper end to allow it to both reciprocate and oscillate with respect to a guide bearing 139. This bearing, which is desirably an anti-friction or needle bearing, is mounted by means of a screw 140 which extends through it and through a washer 141 into a horizontal post 142 with which it is in threaded engagement. This post is in turn mounted on and in the angle member 136 (FIG. 6). Retention of hammer 138 on bearing 139 is effected by the wide head of screw 140 which overlies the edges of the slot in the hammer. The axial thickness of bearing 140 is preferably slightly greater than the thickness of the upper end of hammer 138 so that the hammer can both swing and slide freely around and along the bearing after screw 140 has been set up tightly, but without any particular freedom to move in and out between the underside of the head of screw 140 and the outer surface of washer 141.

The drive for hammer 138 is provided through a shaft 144 which extends through and is rotatably mounted in support member 136. Connection between shaft 144 and hammer 138 is made through a crank 145 fixed on the shaft and an offset crank pin 146 fixed in the hammer and extending rotatably into a bearing within the crank. Rotation of shaft 144 causes hammer 138 to move between two extreme positions shown in dashed outline in FIG. 7 and designated 138′ and 138″. In the course of striking plungers 128 to inject granular material from chambers 123 into spaces between three sequentially arranged filter elements the hammer is moved from position 138′ to position 138″. During this movement the bottom or striking face of the hammer is traveling laterally in the same direction as the upper ends of the plungers being struck, that is, from left to right as seen in FIG. 7.

The plunger operating mechanism of FIGS. 7 and 8 causes two plungers 128 to be struck and driven from retracted inner to expelled outer positions in the course of one revolution of shaft 144, that is, one complete operating cycle of hammer 138. This means that void space between successive filter elements are filled with granular adsorptive-type filter material on essentially a two-at-a-time basis.

Referring again to FIGS. 1 and 7, the filter elements as they are carried past the inner lower edge of charcoal retaining shroud 133 are brought successively into contact with rim 114 and are slightly compressed thereby as shown in FIG. 22 described above. In the present instance, the cut filter elements are assumed to be of about five-sixteenths inch diameter and to be flattened about sixty-eight thousandths of an inch from their original circular form. The momentary deforming and flattening produces a seal between the fibrous filter elements and rim 114 sufficient to avoid uncontrolled escape of granular material 121 as it is expelled from the loading chamber in the rim into the void between adjacent filter elements. Into a void formed by a six-millimeter spacing between adjacent filter elements, an amount of one hundred ten to one hundred twenty milligrams of charcoal of twelve to forty mesh may be injected with the outer end of a plunger 128 leveling and slightly packing the granular material a predeterminedly desired amount. As each filter element is moved forward from the discharge or injection location, the simultaneously moving rim 114 rises from this element permitting it to return to its original configuration now slightly above the level of the injected material 121 thereby providing an effective barrier against movement of the injected granular material from the now filled void once existing ahead of the succeeding filter element.

As the series of filter elements, the charges of granular material 121 between these elements, and the mouthpiece paper 89 directly conveying and partly surrounding both the fibrous and granular filter materials all advance from the discharge or injection location directly below wheel rim 114, they enter the garnitrue section of the apparatus, this section designated 147 being shown particularly in FIG. 19. In this section, which by itself constitutes an apparatus or structure well known to the art, the upwardly extending edges of the mouthpiece paper are turned inwardly and downwardly to form paper strip 89 into an overlapped tubular shape fully enclosing the spaced series of filter elements and the adsorptive granular filter material 121 filling the spaces between them.

The back edge of mouthpiece paper strip 89 is folded over first by action of side member 111. A condition of this edge being folded while the front edge is still running in a stright, upright condition exists substantially at station 23 shown in FIG. 23. Subsequently, of course, the front edge of the paper is turned down on top of the back edge by action of side member 112 or an extension thereof. With mouthpiece paper strip 89 being wider than conveyor belt 95. Overlapping of the paper strip can take place without any overlapping of the belt. The front and back edges of the mouthpiece paper strip are thereafter maintained in overlapped condition by action of a finger element 148 which is affixed to a lateral extension of side member 112 by means of a screw 149 and lock nut 150. The action of finger 148 may be seen particularly clearly in FIG. 24 which is a view at station 24 taken looking "upstream," that oppositely to the direction of motion of conveyor belt 95. With finger 148 exerting pressure on the edges of the mouthpiece paper at their overlap, belt 95 may be allowed to fold out away from the paper without the paper itself unwrapping away from its filter materials contents. Such out-folding and eventual flattening of the conveyor belt is, of course, necessary in order that the belt run smoothly over pulley 94.

Very shortly after the paper 89 has been wrapped into an overlapped tube it is sealed so as to form a continuous rod of filter assemblies (FIG. 9). As used in the apparatus of the present invention, the mouthpiece paper 89 is of heat-sealable material or is treated to be heat-sealable. A heat sealing unit 151 (FIG. 1), commercially available, heated by electrical means is pivotally mounted in the path of the stream of mouthpiece paper 89. The pivot mounting provides for the sealing unit to be swung up and away from the conveyor belt channel as shown in FIG. 1, and to be swung down to a pre-selected position above this channel. The illustrated sealing unit has a thin metallic band 152 mounted on pulleys and driven at a slower speed in the same direction as the conveyor belt 95. When sealing unit 151 is in its lowered position as indicated in FIG. 2, metallic band 152 is disposed to run in contact with the overlapped material of paper strip 89, exerting at least a slight pressure thereupon. The overlapped mouthpiece paper 89 and its contents are now moved on the conveyor belt to and under the heat sealer and the paper strip is sealed by heated band 152 to form a continuous rod of assembled filters of alternate fibrous elements 42, 53 and sections of granular material 121 securely wrapped within the tube of overlapped mouthpiece paper 89. In the present instance this rod of filter material is cut into "plugs" having six times the length of the individual filter assembly desired for each cigarette. This length of plug is selected so as be readily fed and cut in a later operation by the filter attachment of a cigarette making machine. In FIGS. 1 and 2 there is shown a cutter 153 similar in all respects to the cutter 44 used to produce elements 42. Each plug delivered from cutter 153 is collected for later operations by equipment not shown.

Synchronization of the above described operations, particularly at the operating speeds indicated, is of utmost importance. The drive system of the illustrated apparatus accordingly has been equipped with certain novel timing controls providing therewith the necessary adjustments required for the satisfactory performance in regulated sequence of the various operations of making the three-section filter tip assemblies hereinbefore described.

Referring to FIGS. 2 and 4, an electric drive motor 154 drives a thirteen tooth sprocket 155 which in turn drives a seventy-two tooth sprocket 156 by means of a suitable belt 157, for example a chain belt. The seventy-two tooth sprocket 156 is suitably fixed on one end of transfer shaft 158 which mounts a fixed fourteen tooth sprocket 159 at the other end thereof. The fourteen tooth sprocket 159 drives a thirty-six tooth sprocket 160 on a transfer shaft 161 by means of a suitable belt 162. The transfer shaft 161 drives the main shaft 163 of the apparatus of this invention by means of a pair of twenty-four tooth sprocket 164, 165, each fixedly mounted on a respective shaft 161, 163, and a suitable belt 166.

The transfer shaft 161 drives the pulley wheel 167 of the conveyor system which propels the cellulose acetate fiber rod 40 to the cutter 41 by a suitable gear and shaft arrangement 168.

The main shaft 163 drives the gear mechanism of the cutter 41 by a suitable gear arrangement which includes a thirty-six tooth sprocket 169 fixedly mounted on the main shaft 163 which drives a transfer shaft 170 through an eighteen-tooth sprocket 171 fixedly mounted thereon and suitable belt 172. The transfer shaft 170 has a sixty-eight tooth bevel gear 172 at one end thereof (FIG. 4) which drives a twenty-four tooth bevel gear 173 on the drive shaft of the cutter 41. The transfer shaft 170 is suitably mounted in a journal bearing 174 which is secured to the transfer shaft 161 so as to be independently rotatable therewith.

The transfer shaft 170 also drives the threaded worm spacing drum 85 and the injector mechanism 110 in synchronized relationship to the remainder of the apparatus of this invention. The threaded worm spacing drum 85 is driven off the transfer shaft 170 by means of a thirty-four tooth sprocket 175, fixedly mounted on the transfer shaft 170, which drives a transfer shaft 176 through a twelve tooth sprocket 177 which is fixedly mounted at one end thereof and a suitable belt 178. A sixteen tooth sprocket 179 is fixedly mounted on the opposite end of the transfer shaft 176 and is connected by a suitable belt 180 to a sixteen tooth sprocket 181 fixedly mounted on the drive shaft 182 of the spacing drum 85.

The injector mechanism 110 is driven off the transfer shaft 170 by means of a sixty-eight tooth sprocket 183, fixedly mounted on the transfer shaft 170, which drives a transfer shaft 184 through a twelve tooth sprocket 185 which is fixedly mounted at one end thereof and a suitable belt 186. A suitable commercially available 1:1 right-angle drive 187 is operably connected to the opposite end of the transfer shaft 184 and to the drive system of the injector mechanism 110.

Referring to FIG. 6, the right angle drive 187 drives a shaft 188 which fixedly mounts a seventy-two tooth gear 189 and a twenty-eight tooth sprocket 190 thereon. The sprocket 190 (FIG. 10) drives a shaft 191 by means of a one hundred twenty tooth sprocket 192 fixedly mounted on one end thereof and a suitable belt 193 which is suitably tensioned by a tension roller 194 mounted on member 136. A forty tooth gear 195 is fixedly mounted on the opposite end of shaft 191 and drives the two hundred eighty tooth rim 114 of the injector mechanism 110. The seventy-two tooth gear 189 meshes with a seventy-two tooth gear 196 which is fixedly mounted to the hammer actuating shaft 144. The hammer actuating shaft 144 is rotatably mounted in a suitable support 197 at one end, journalled in the base supported angle member 136 by a suitable bearing 198 and connected to the hammer 138 as shown in FIG. 8.

The injector mechanism 110 is operably connected to the holddown assembly 101 by means of a suitable take-off gear mechanism which is driven by the shaft 125 of the injector mechanism 110. The shaft 125 has a thirty-nine tooth sprocket 200 fixedly mounted at one end thereof which drives a ten tooth sprocket 201 by a suitable belt 202 which is suitably tensioned by an adjustable toothed roller 203 slidably mounted on member 136. The sprocket 201 is fixedly mounted on one end of a transfer shaft 204 which has the sixty tooth drive roller 103 (FIG. 17) mounted on the other end thereof. As shown in FIG. 6, tensioning roller 105 is slidably mounted in a slotted support frame 205.

The main shaft 163 also drives the gear mechanism of the cutter 54. A twenty-four tooth sprocket 206 fixedly mounted on main shaft 163 is connected to a twenty-four tooth sprocket 207 fixedly mounted on cutter shaft 208 by a suitable belt 209. As shown in FIG. 15, a seventy tooth gear 210 is fixedly mounted on cutter shaft 208 and meshes with another seventy tooth gear 211 which is fixedly mounted on shaft 212. A seventeen tooth sprocket 213 is fixedly mounted on one end of shaft 212 and drives a fifty-four tooth sprocket 214 fixedly mounted on plug cutting drum shaft 215 by means of a suitable belt 216. A fifty-four tooth sprocket 217 is fixedly mounted on the other end of shaft 215 and drives a forty-five tooth sprocket 218 fixedly mounted on the plug separating drum assembly shaft 218, a thirty tooth sprocket 220 fixedly mounted on the plug transfer drum shaft 221 and a twelve tooth sprocket 222 fixedly mounted on a shaft 223 by means of a suitable belt 224. The plug transfer drum shaft 221 also fixedly mounts a thirty tooth sprocket 225 (not shown) and a twenty tooth sprocket 226 thereon, each of which drives a sprocket 227, 228, having twenty-seven and twenty-four teeth, respectively, on drum assembly shaft 219 by means of suitable belts 229, 230. The belts 229, 230 are carried over respective sprockets 231, 232 fixedly mounted on a shaft 233. Referring to FIG. 18, each sprocket 218, 227, 228 drives one of the rotatable drums 64, 65, 66 in a suitable well-known manner. The shaft 223 also carries a fixedly mounted twelve tooth sprocket 234 which drives a shaft 235 by means of a twelve tooth sprocket 236 and belt 237. Shaft 235 also carries a cam 238 thereon which cooperates with lever 239 on the adjustable feed regulator 57 so that upon rotation of the cam 238 the regulator is oscillated.

Shaft 221 carries a suitable worm gear 240 thereon which meshes with a worm gear 241, in one to one relation, on shaft 242. Shaft 242 carries a forty tooth sprocket 243 on the end thereof which drives a ten tooth sprocket 244 fixedly mounted on the spoked delivery wheel shaft 245 by means of a siutable belt 246 which is tensioned by a suitable tensioning roller 247 (FIG. 16).

Referring to FIG. 14, a separate motor 248 drives the plug cutting knives 61, 62 independently of the remainder of the apparatus of this invention. The motor 248 drives a pulley wheel 249 which drives a pulley wheel 250 fixedly mounted on a shaft 251 by means of a pulley belt 252. The motor 248 also drives a second pulley wheel 253 which drives a pulley wheel 254 fixedly mounted on a shaft 255 by means of a pulley belt 256. Shaft 251 fixedly mounts a pulley 257 thereon which drives the knife shafts 258, 259 by means of respective pulleys 260, 261 and pulley belt 262. Shaft 255 fixedly mounts a pair of pulleys 263, 264 (not shown) each of which drives a grindstone 265, 266 by means of a suitable pulley and belt arrangement 267, 268. The grindstones 265, 266 are thus capable of continuously sharpening the knives 61, 62 with which they are suitably positioned.

Figure 10:
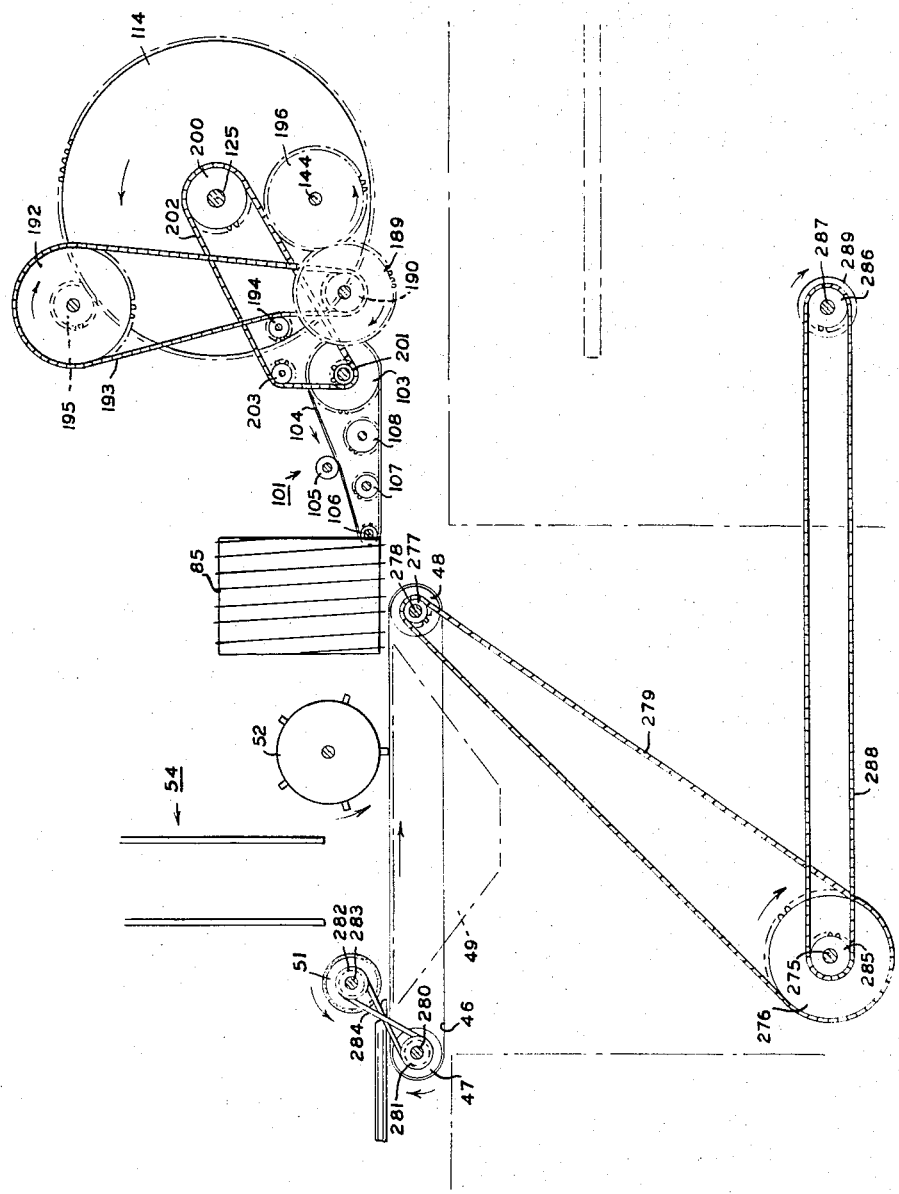
FIGURE 10 represents a rear elevation partly structural and partly schematic showing the drive arrangement for the radially chambered wheel, the hold down belt, the vacuum belt, and the mouthpiece paper wheel.

Referring to FIGS. 3 and 10, the main shaft 163 also drives the vacuum conveyor belt assembly 45 and roller 51 as well as the drive system 91 for the strip of mouthpiece paper 89. The drive system is effected by means of a fifteen tooth sprocket 269 fixedly mounted on the main shaft 163 which drives an eleven tooth sprocket 270 fixedly mounted on a transfer shaft 271 by means of a suitable belt 272. A twenty-four tooth bevel gear 273 is mounted on the end of transfer shaft 271 and meshes with another twenty-four tooth level gear 274 mounted on the end of a transfer shaft 275. The transfer shaft 275 fixedly mounts a forty-eight tooth sprocket 276 at its other end which drives a ten tooth sprocket 277 which is fixedly mounted on a shaft 278 by means of a suitable belt 279. Shaft 278 mounts the roller 48 of the vacuum belt assembly 45 on one end thereof and the roller 48 drives the perforated belt 46 over roller 47. Roller 47 is fixedly mounted on a short shaft 280 which also fixedly mounts a pulley wheel 281 thereon. Pulley wheel 281 drives a pulley wheel 282 which is fixedly mounted on the shaft 283 which carries roller 51 by means of a suitable pulley belt 284 in a one-to-one relationship.

An eighteen tooth sprocket 285 is fixedly mounted on the transfer shaft 275 at an intermediate point thereof and drives an eighteen-tooth sprocket 286 which is fixedly mounted on a shaft 287 by means of a suitable belt 288. The shaft 287 fixedly mounts the drive roller 289 of the mouthpiece paper drive system 91 at the other end thereof.

Referring again to FIG. 2, main shaft 163 is finally utilized to drive the mechanism of the heat sealing unit 151 and cutter 153. The main shaft 163 fixedly mounts a sixty tooth sprocket 290 at the end thereof. The sprocket 290 drives an eighteen tooth sprocket 291 which is fixedly mounted on a transfer shaft 292 by means of a suitable belt 293. The transfer shaft 292 fixedly mounts a sprocket 294 which drives the heat sealing unit 151 through a suitable sprocket and belt arrangement 295 so that the sealing unit 151 is properly synchronized with the remainder of the apparatus. The transfer shaft 292 also is connected at its end to a coupling which journals a non-driven rotatable shaft 296 which carries the mouthpiece paper roll 94, and drives a drive shaft 297 which carries a sixty tooth bevel gear 298 at one end. The bevel gear 298 meshes with and drives a thirty-four tooth bevel gear 299 which is fixedly mounted on the drive shaft of cutter 153. In order to correctly time the injector mechanism 110 and subsequent cutter 153 gear assemblies, particular timing controls are incorporated therein. As shown in FIG. 5, a pair of idler sprockets 300, 301 are mounted within the chain belt 186 of the injector mechanism drive assembly. Sprocket 300 is pivotally mounted at one end thereof and spring loaded by a suitable spring 302 so that it is constantly urged outwardly against the chain belt 186. Sprocket 301 is also pivotally mounted at one end thereof; however, it is connected to a suitable threaded adjusting screw stem 303. The screw stem 303 allows the sprocket 301 to be manually adjusted outwardly or inwardly of the chain belt 186 in opposition to the sprocket 300 thereby causing movement of belt 186 and sprocket 185. Thus, by appropriate adjustment of screw stem 303, the injector mechanism 110 can be properly timed to the remainder of the apparatus.

Figure 13:
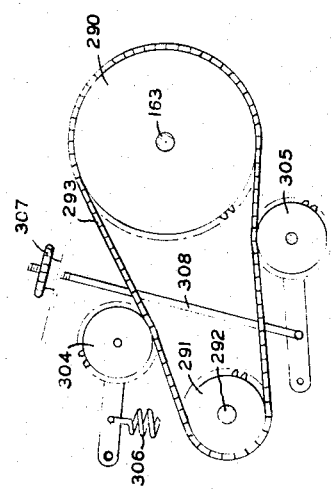
FIGURE 13 represents a side elevation view taken on the line 13—13 of FIGURE 2, the view partly schematic and showing the mechanism for advancing or retarding the endless belt carrying the mouthpiece paper and the filter tips above and on the paper.

Referring to FIG. 13, a pair of idler sprockets 304, 305 are mounted outside and in engagement with the chain belt 293 of the drive mechanism of the cutter 153. Sprocket 304 is pivotally mounted at one end thereof and spring loaded by a suitable spring 306 so that it is constantly urged inwardly against the chain belt 293. Sprocket 305 is also pivotally mounted at one end thereof; however, it is connected to a suitable knob control means 307 by means of a threaded shaft 308 which is suitably attached thereto. The knob control means 308 allows manual adjustment of the sprocket 305 in opposition to the spring loaded sprocket 304 and corresponding rotation of sprocket 291 so that the cutter 153 may be properly timed to the remainder of the apparatus.

It is to be noted that both timing mechanisms can be operated during operation of the apparatus of this invention so that there will be no interruption in the flow of filter tips therefrom.

Referring to FIGS. 25 to 28, wherein a modification of the alternating feed mechanism is shown and wherein like reference characters indicate like parts in FIGS. 1 to 24, a cutter 41 is interposed in the path of two continuous streams of fibrous filter rods 400, 401. Each stream of filter rods 400, 401 is fed forwardly by a feed-up wheel mounted on a common shaft 402. Primary feed-up wheel 403 feeds the stream 400, whereas, secondary feed-up wheel 404 which is of smaller diameter than the primary wheel 403, feeds the stream 401. Because of the difference in wheel diameters, stream 400 is fed at a faster rate than stream 401 to the cutter 41. The wheels 403, 404 are synchronized with the remainder of the apparatus by means of a suitable gear mechanism, similar to that shown in FIG. 4 and need not be further described.

Each stream 400, 401 is fed through a suitable guide tube 405, 406 mounted on a bracket 407 to a suitable reciprocable ledger 408, 409. The ledgers 408, 409 are connected to each other by suitable bar members 410 so that they can reciprocate as a unit. Thus, the lengths of rod which are cut from the streams 400, 401 by means of the cutter knife (not shown) whose centerline 411 is shown in FIGS. 25 to 27 and whose path 412 is shown in FIG. 28, are unequal; stream 400 being divided into a series of elements 53 of 18 mm. in length and stream 401 being divided into a series of shorter elements 42 of 12 mm. in length. The longer elements 53 can be made of a different fibrous filter material from the elements 42, for example, elements 53 may be paper filter elements while elements 42 are cellulose acetate elements.

Referring to FIGS. 32 and 31, each ledger includes a U-shaped main body portion 413 having a pair of arms 414, 415 each of which has a bore 416 therethrough. A suitable cylindrical guide bushing 417, 418 is mounted within the bore of each arm to guide a rod stream therethrough. Each arm is slotted at its end and a threaded bolt 419 is threaded therethrough so that upon tightening of the bolt 419 the guide bushing can be locked in place. Each arm is also provided with a resilient plate 420, held therein by a threaded bolt 421, so that by cooperation between a pair of plates, a suitable cutter knife guide is formed which allows the knife to sever the rod streams perpendicularly.

Referring to FIGS. 28 and 33, the ledgers 408, 409 are held in fixed relationship to each other by the pair of bar members 410, each of which consists of an elongated member having a bore at each end thereof for passage of a ledger securing bolt means 422 therethrough. The end of the member 410 which is secured to the lowermost ledger 409 is further provided with a slot 423 communicating with the bore 424 therein. A threaded bolt 425 provides a locking means for maintaining the ledger 409 in proper position with respect to the member 410. The ledgers 408, 409 are further slidably secured to the cutter 41 by a suitable bracket 426.

Referring again to FIGS. 25 to 30, the severed elements 42, 53 are fed from the respective ledgers through the guide bushings 417 into suitable ledger tubes 427, 428 which are appropriately connected thereto. The end of each ledger tube 427, 428 is suitably provided with a guide lip 429 and spring finger 430 (FIG. 29) whereby the elements 42, 53 are delivered to the vacuum conveyor belt 46. The spring finger 430 serves as a stop means to bunch up the elements 42, 53 in the ledger tube 428 and to maintain the initial element on the guide lip 429 over the perforated belt 46. The ledgers and ledger tubes are reciprocated axially at a speed twice that of the stream 401 so that a suitable spacing may be obtained between the elements ejected onto the perforated belt 46. As soon as an element is cut from a stream, the respective ledger and now completely filled ledger tube moves forwardly at a greater speed than the continuously moving stream carrying the element therewith and causing a space between the last severed element and the stream. The respective ledger then moves rearwardly and upon reaching its rearmost position the stream comes into a position which contacts the last severed element, the last severed element having moved forwardly in the ledger tube a distance approximately equal to its length. The movement of this element, as well as the corresponding ejection of the initially severed element in the ledger tube, is effected by the jerking motion of the ledger and ledger tube as they reach their forwardmost positions.

The ledger tubes 427, 428 are so proportioned and positioned with respect to the perforated belt 46 that the respective elements 42, 53 are fed onto the preforated belt 46 in alternating fashion.

While the invention has been thus described, it is not intended that the invention be so limited since certain modifications in carrying out the above process and the constructions set forth which embody the invention may be made without departing from the scope of the invention. Accordingly, it is intended that all matter contained in the foregoing description or shown in the accompanying drawings shall be interpreted as illustrative and not in a limiting sense.

I claim:

1. Apparatus for the production of cigarette filter tips having multi-sectional internal construction, said apparatus comprising means for feeding a plurality of filter elements of disparate lengths into an alternating series; means for receiving and conveying the alternating series of filter elements thereon; means located in said receiving and conveying means for longitudinally aligning the filter elements of the alternating series of filter elements; means for spacing each filter element of the alternating series of filter elements an equal distance from the preceding and succeeding filter element in the alternating series; means for delivering a continuously generated strip of mouthpiece paper under said spacing means for receiving the equally spaced filter elements of the alternating series of filter elements thereon; means located in axial alignment with said spacing means for conveying the strip of mouthpiece paper with the alternating series of equally spaced filter elements thereon away from said spacing means; means positioned over said conveying means in alignment with the strip of mouthpiece paper for injecting a predetermined charge of granular adsorptive-type filter material into each determinate space between successive filter elements of the alternating series of filter elements; means for forming the strip of mouthpiece paper into an overlapped tube fully enclosing the alternate filter elements and injected granular material; means for sealing the overlapped strip of mouthpiece paper for forming a rod-shaped assembly of alternating sections of filter elements and granular materials; and means for cutting the rod-shaped assembly into successive filter tip assemblies of determinate length.

2. An apparatus as set forth in claim 1 wherein said receiving and conveying means comprises a conveyor belt having a series of axially staggered perforations therein, and said longitudinally aligning means comprises a vacuum chamber cooperating with said conveyor belt whereby the vacuum suction forces created by said chamber are directed on the filter elements on said conveyor belt through the perforations of the conveyor belt so as to axially align the filter elements with respect to said conveyor belt.

3. An apparatus as set forth in claim 2 wherein said conveyor belt is provided with perforations which are alternately staggered a distance of one-sixty-fourth of an inch on each side of the longitudinal axis of said conveyor belt.

4. An apparatus as set forth in claim 1 wherein said spacing means comprises a rotatable drum having a plurality of projecting cam threads thereon, each said thread adapted to abut and push therealong alternate elements of the alternating series of elements.

5. An apparatus as set forth in claim 4 further comprising a guide channel means for maintaining alignment of the alternating series of elements while within the limits of said rotatable drum.

6. An apparatus as set forth in claim 1 wherein said conveying means comprises a conveyor belt transversely formable into a U-shaped and a pair of troughing side members mounted on a slide plate and defining therewith a channel for forming and guiding said conveyor belt and mouthpiece paper into transverse U-shape containing the alternating series of equally filter elements.

7. Apparatus according to claim 6 which further comprises a holddown assembly mounted above said conveying means before said granular material injection means and moving in timed relationship to said conveyor belt to engage the upper surfaces of cut filter elements and maintain the elements in spaced alignment on the mouthpiece paper on and moving with said conveyor belt.

8. An apparatus as set forth in claim 6 wherein said forming means comprises a garniture section mounted on and forming an extension of said troughing side members for receiving the transversely U-shaped strip of mouthpiece paper containing alternately filter elements and granular adsorption-type material and for turning and forming the edges of the paper into contiguous relationship, and said sealing means comprises a heat sealing unit situated adjacent said conveyor belt beyond said garniture section and disposable to bear upon and heat the overlapped strip of mouthpiece paper and join the edges thereof.

9. Apparatus according to claim 8 which further comprises synchronizing means for adjusting the timed relationship between the injecting of the granular adsorptive-type filter material and the action of said conveying means carrying the filter elements, said synchronizing means including a chain drive between said conveying means and injection means with driver and driven sprockets connected by a roller chain, tensioning means for maintaining a relatively constant tension in the chain, and means for changing the length of said roller chain between said driver and driven sprockets.

10. An apparatus as set forth in claim 1 wherein said injecting means comprises means for receiving an individual measured quantities of granular adsorption-type filter material from a supply thereof, means for transferring the measured quantities of material to a discharge location above said conveying means, and means for injecting in timed relationship to action of said conveying means measured quantities of granular material into a pair of spaces defined by three succeeding filter elements.

11. Apparatus according to claim 1 in which the means for injecting a charge of granular material includes a wheel rotatably mounted above said conveyor belt, said wheel being characterized by at least one radial chamber opening through the rim thereof, a plunger mounted on the wheel and slidably movable in said chamber, cooperable means on said plunger and wheel providing stops to limit the movement of the plunger between an expelled outer and a retracted inner position, and means for moving the plunger outwardly at the time of injection of adsorptive-type granular material into the determinate spaces between fibrous filter elements and thereafter returning the plunger to its inner retracted position.

12. Apparatus according to claim 11 in which there is a hopper mounted above said wheel and having an open bottom slidably engaging the wheel rim, said hopper providing for receiving and feeding of the granular filter material, and means for rotating the wheel in way of the hopper for filling each chamber with granular material, and thereafter moving each filled chamber to a bottom discharge location over a determinate space between advancing sequential fibrous filter elements.

13. Apparatus according to claim 12 in which there is rim cleaning means for said wheel mounted on and extending into the hopper for removing the residual granular material from the chamber-filled rim, and a shroud mounted adjacent the wheel and having a surface slidably contacting the rim for holding granular material without spillage in the filled radial chambers of the moving wheel as successive portions of the rim thereof are moved from the hopper to the bottom discharge location.

14. Apparatus according to claim 1 which further comprises a drive system including means for driving a first power shaft at a selected rate of speed; first means for driving said feeding means from said first power shaft; second means for driving from said first power shaft a first transmission means for driving said receiving and conveying means; third means for driving from said first power shaft a second transmission means for driving said conveying means and said assembly cutting means; first means for varying the rotational relationship of said second transmission means to said first power shaft for synchronizing the operations of said feeding means and said assembly cutting means; fourth means for driving from said first power shaft a third transmission means for driving said injecting means; second means for varying the rotational relationship of said third transmission means to said first power shaft for synchronizing the operations of said feeding means and said injecting means; and fifth means for driving from said first power shaft a fourth transmission means for driving said spacing means.

15. Apparatus according to claim 14 in which said means for varying the rotational relationship of said first power shaft to said second transmission means and of said third transmission means to said first power shaft each include a chain drive assembly having a driver sprocket, a driven sprocket, a roller chain connecting said driver and driven sprockets, a spring-biased idler sprocket engaging said roller chain on its non-pulling side and bowing said chain to maintain a relatively constant tension therein, and a controllably movable idler sprocket engaging said chain on its pulling side intermediate the driver and driven sprockets whereby the length of the pulling side of the chain in between these sprockets may be changed to vary the rotational relationship of the driver and driven sprockets.

16. Apparatus for the production of cigarette filter tips having multi-sectional internal construction, said apparatus comprising a first means for continuously feeding and successively cutting a rod of entrainment-type fibrous filter material into first equal-length filter elements; means for receiving and conveying the first filter elements in spaced relationship thereon; a second means for continuously feeding and cutting plugs of entrainment-type fibrous filter material into second equal-length filter elements of a length disparate from the first equal-length filter elements; means for delivering the second filter elements to said receiving and conveying means in spaced relationship and in alternating manner with respect to the first filter elements whereby an alternating series of spaced first and second filter elements is formed; means located in said receiving and conveying means for longitudinally aligning the filter elements of the alternating series of filter elements; means for spacing each filter element of the alternating series of filter elements an equal distance from the preceding and succeeding filter element in the alternating series; means for delivering a continuously generated strip of mouthpiece paper under said spacing means for receiving the equally spaced filter elements of the alternating series of filter elements thereon; means located in axial alignment with said spacing means for conveying the strip of mouthpiece paper with the alternating series of equally spaced filter elements thereon away from said spacing means; means positioned over said conveying means in alignment with the strip of mouthpiece paper for injecting a predetermined charge of granular adsorptive-type filter material into each determinate space between successive filter elements of the alternating series of filter elements; means for forming the strip of mouthpiece paper into an overlapped tube fully enclosing the alternate filter elements and injected granular material; means for sealing the overlapped strip of mouthpiece paper for forming a rod-shaped assembly of alternating sections of filter elements and granular materials; and means for cutting the rod-shaped assembly into successive filter tip assemblies of determinate length.

17. Apparatus according to claim 16 in which said first fibrous filter rod material cutting means operates at a given rate of cuts per unit time, and said rod-shaped assembly cutting means operates at a relative lesser rate of cuts per unit time to cut selectively spaced fibrous filter elements transversely at their mid-lengths producing successive filter tip assemblies each having a length comprising the entire filter material for at least one cigarette.

18. Apparatus according to claim 17 in which the selectively spaced fibrous filter elements are each sixth fibrous filter element.

19. Apparatus for the production of cigarette filter tips having multi-sectional internal construction, said apparatus comprising a first means for continuously feeding and successively cutting a rod of entrainment-type fibrous filter material into first equal-length filter elements; perforated conveyor belt means for receiving and conveying the first filter elements in spaced relationship thereon; a second means for continuously feeding and cutting plugs of entrainment-type fibrous filter material into second equal-length filter elements of a length disparate from the first equal-length elements; means for delivering the second filter elements to said conveyor belt means in spaced relationship and in alternating manner with respect to the first filter elements whereby an alternating series of spaced first and second filter elements is formed, said delivering means including a delivery wheel having a plurality of filter element engaging spokes thereon for depositing a second filter element on said conveyor belt between a pair of first filter elements said delivery wheel being in timed relationship with said first feeding and cutting means; vacuum chamber means positioned in cooperation with said perforated conveyor belt means for longitudinally aligning the filter elements on said belt, said vacuum chamber adapted to create vacuum suction forces for action through said perforated belt whereby the filter elements thereon are longitudinally aligned thereto; rotatable drum means having a pair of projecting cam threads thereon, one of said threads being spaced disparately from the other of said threads in relation to the disparate lengths of the first and second filter elements, each thread adapted to abut and push there-along alternate elements of the alternating series of elements in aligned array whereby the disparate spacing of said threads causes the filter elements to become equally spaced; means for delivering a continuously generated strip of mouthpiece paper under said rotatable drum for receiving the equally spaced filter elements thereon; conveying means including a conveyor belt transversely formable into a U-shape and a pair of troughing side members mounted on a slide plate and defining therewith a channel for forming and guiding said conveyor belt and strip of mouthpiece paper into transversely U-shape containing the equally spaced elements; holddown means cooperating with said conveying means for maintaining the equal spacing of the equally spaced elements on said conveyor belt; injection means including means for receiving measured quantities of granular adsorption-type filter material therein, means for transferring the quantities of material to a discharge location above said conveying means, and means for injecting in timed relationship to said conveying means measured quantities of material into a pair of spaced defined by three successive equally spaced elements, means for forming the strip of mouthpiece paper into an overlapped tube fully enclosing the alternate filter elements and injected granular material, means for sealing the overlapped strip of mouthpiece paper for forming a rod-shaped assembly of alternating sections of filter elements and granular materials; and means for cutting the rod-shaped assembly through the mid-point of every sixth filter element into successive filter tip assemblies.

20. Apparatus for the production of cigarette filter tips having multi-sectional internal construction, said apparatus comprising means for continuously feeding and successively cutting a plurality of rods of entrainment-type fibrous filter material into a plurality of streams of equal-length filter elements, each stream of equal-length filter elements having filter elements of a length disparate from the lengths of the filter elements in the other streams; means for receiving and conveying the streams of filter elements in spaced relationship; means for delivering the streams of filter elements to said receiving and conveying means in alternating manner whereby an alternating series of filter elements is formed; means located in said receiving and conveying means for longitudinally aligning the filter elements of the alternating series of filter elements; means for spacing each filter element of the alternating series of filter elements an equal distance from the preceding and succeeding filter element in the alternating series; means for delivering a continuously generated strip of mouthpiece paper under said spacing means for receiving the equally spaced filter elements of the alternating series of filter elements thereon; means located in axial alignment with said spacing means for conveying the strip of mouthpiece paper with the alternating series of equally spaced filter elements thereon away from said spacing means; means positioned over said conveying means in alignment with the strip of mouthpiece paper for injecting a predetermined charge of granular adsorptive-type filter material into each determinate space between successive filter elements of the alternating series of filter elements; means for forming the strip of mouthpiece paper into an overlapped tube fully enclosing the alternate filter elements and injected granular material; means for sealing the overlapped strip of mouthpiece paper for forming a rod-shaped assembly of alternating sections of filter elements and granular materials; and means for cutting the rod-shaped assembly into successive filter tip assemblies of determinate length.

21. An apparatus as set forth in claim 20 wherein said feeding and cutting means comprises a cutter means, a plurality of mutually fixed ledgers reciprocably mounted on said cutter means for cooperation therewith, means for feeding a plurality of filter material rods at disparate rates of speed, each rod being fed to a respective one of said ledgers, ledger tube means mounted in each of said ledgers and extending over said receiving and conveying means, each of said ledger tubes having a guide lip and a spring finger at one end thereof for retaining a filter element thereon whereby upon movement of said ledgers to a foremost position a filter element is discharged from said guide lip onto said receiving and conveying means.

22. An apparatus as set forth in claim 21 wherein each of said ledger means includes a cutter knife guide means therein.

23. An apparatus as set forth in claim 21 wherein said ledgers are synchronized to reciprocate at a rate of speed twice that of the rate of speed of the slowest moving filter material rod fed through said ledgers.

24. A process for assembling a continuous rod of alternating fibrous and granular material, said process comprising the steps of feeding a first series of spaced equal length filter elements onto a receiving and conveying means; feeding a second series of spaced equal length filter elements which is of disparate length from said first series of elements onto said receiving and conveying means in alternating manner with respect to said first series of elements to form an alternating series of filter elements; longitudinally aligning said alternating series of elements; equally spacing each element of said alternating series a determinate distance from the preceding and succeeding element of said alternate series; delivering said alternating series of equally spaced elements onto a continuously generated strip of mouthpiece paper; conveying said strip of mouthpiece paper and said alternating series of equally spaced elements under an injection mechanism; injecting a predetermined charge of granular adsorptive-type filter material from said injection mechanism between successive element of said alternating series of elements; forming said strip of mouthpiece paper into an overlapped tube with successive fibrous filter elements and granular filter material enclosed fully therein, and sealing said overlapped tube to form a rod of alternating types of filter material.

25. A process for assembling a continuous rod of alternating fibrous and granular material, said process comprising the steps of feeding a first series of spaced equal length filter elements onto a receiving and conveying means; feeding a second series of spaced equal length filter elements which is of disparate length from said first series of elements onto said receiving and conveying means in alternating manner with respect to said first series of elements to form an alternating series of filter elements; longitudinally aligning said alternating series of elements; equally spacing each element of said alternating series a determinate distance from the preceding and succeeding element of said alternating series; delivering said alternating series of equally spaced elements onto a continuously generated strip of mouthpiece paper; maintaining said alternating series of elements in equally spaced relationship; conveying said strip of mouthpiece paper and said alternating series of equally spaced elements under an injection mechanism; injecting a predetermined charge of granular adsorptive-type filter material from said injection mechanism between successive elements of said alternating series of elements on a two-at-a-time basis; forming said strip of mouthpiece paper into an overlapped tube with successive fibrous filter elements and granular filter material enclosed fully therein; and sealing said overlapped tube to form a rod of alternating types of filter material.

References Cited

UNITED STATES PATENTS

| | | | |
|---|---|---|---|
| 3,131,612 | 5/1964 | Rowlands | 93—1 |
| 3,308,832 | 3/1967 | Stelzer et al. | 93—1 XR |

BERNARD STICKNEY, *Primary Examiner.*